US011170116B2

(12) United States Patent  
Mousseau et al.

(10) Patent No.: US 11,170,116 B2  
(45) Date of Patent: Nov. 9, 2021

(54) SYSTEMS, DEVICES AND METHODS FOR PROTECTING AND EXCHANGING ELECTRONIC COMPUTER FILES

(71) Applicant: 3D BRIDGE SOLUTIONS INC., Waterloo (CA)

(72) Inventors: Gary Mousseau, Waterloo (CA); Karima Bawa, Vancouver (CA)

(73) Assignee: 3D Bridge Solutions Inc., Vancouver (CA)

( * ) Notice: Subject to any disclaimer, the term of this patent is extended or adjusted under 35 U.S.C. 154(b) by 225 days.

(21) Appl. No.: 16/165,776

(22) Filed: Oct. 19, 2018

(65) Prior Publication Data

US 2019/0121989 A1   Apr. 25, 2019

Related U.S. Application Data

(60) Provisional application No. 62/574,597, filed on Oct. 19, 2017, provisional application No. 62/580,644, filed on Nov. 2, 2017.

(51) Int. Cl.
*G06F 21/60* (2013.01)
*G06F 21/62* (2013.01)
(Continued)

(52) U.S. Cl.
CPC ........ *G06F 21/602* (2013.01); *G06F 21/6209* (2013.01); *G06F 21/6218* (2013.01);
(Continued)

(58) Field of Classification Search
CPC ....... G06F 21/10–105; G06F 21/31–32; G06F 21/60–604; G06F 21/62–6209;
(Continued)

(56) References Cited

U.S. PATENT DOCUMENTS 6,158,010 A    12/2000  Moriconi
6,487,594 B1   11/2002  Bahlmann
(Continued)

OTHER PUBLICATIONS https://msdn.microsoft.com/en-us/library/cc838192(v=vs.95).aspx, Digital Rights Management (DRM), Nov. 16, 2011.
(Continued)

*Primary Examiner* — Kevin Bechtel
(74) *Attorney, Agent, or Firm* — Norton Rose Fulbright Canada LLP; Maya Medeiros

(57) ABSTRACT

Embodiments described herein provide a system and method for controlling access to electronic files by linking the files to a file access monitoring system, called the file access monitor in this application. The file access monitor then authorizes the use of the one or more files by performing one or more qualifying steps on the accessing computer system. The file access monitor may be a standalone program or an embedded logic within a closed system like an application, an operating system (O/S), an external device like a printer, a web browser or a web browsing application. Access to electronic files can include the exchange, modification, execution, printing, viewing, listening, copying and replication of these files to name a few. A given protected electronic file is transferred from a sending computer system to a receiving computer system for eventual access. The receiving computer may also become the accessing computer should a user on the receiving computer wish to access the transferred file. To access a given protected file one or more qualifying steps must be performed to grant access and to unlock the file. In some cases the qualifying step involves a specific activity called a system attribute identification process.

26 Claims, 14 Drawing Sheets

(51) Int. Cl.
 H04L 29/08 (2006.01)
 H04L 29/06 (2006.01)
 H04L 9/32 (2006.01)
 H04W 4/70 (2018.01)
 H04L 9/14 (2006.01)
(52) U.S. Cl.
 CPC ................ *H04L 9/14* (2013.01); *H04L 9/321* (2013.01); *H04L 9/3226* (2013.01); *H04L 63/0435* (2013.01); *H04L 63/0861* (2013.01); *H04L 67/10* (2013.01); *H04L 67/12* (2013.01); *H04W 4/70* (2018.02)
(58) Field of Classification Search
 CPC ..... G06F 21/6218–6245; H04L 9/0819–0836; H04L 9/0894–0897; H04L 9/14–16; H04L 9/32–3213; H04L 9/3226–3231; H04L 63/0428–0492; H04L 63/06–068; H04L 63/08–0892; H04L 67/10; H04L 67/12–125; H04L 2209/60–603; H04L 2463/101; H04W 4/70
 See application file for complete search history.

(56) References Cited

U.S. PATENT DOCUMENTS

| | | | |
|---|---|---|---|
| 8,560,709 | B1 | 10/2013 | Shokhor |
| 9,248,788 | B2 | 2/2016 | Sekiguchi |
| 2005/0240545 | A1* | 10/2005 | Schachtely ........ G05B 23/0227 706/47 |
| 2008/0066148 | A1 | 3/2008 | Lim |
| 2008/0109871 | A1 | 5/2008 | Jacobs |
| 2008/0209505 | A1 | 8/2008 | Ghai |
| 2009/0100268 | A1* | 4/2009 | Garcia ................ G06F 21/6218 713/184 |
| 2009/0110192 | A1* | 4/2009 | Elrod .................... H04L 9/0866 380/44 |
| 2009/0178111 | A1 | 7/2009 | Moriconi |
| 2009/0287930 | A1* | 11/2009 | Nagaraja ................... H04L 9/08 713/171 |
| 2014/0058959 | A1* | 2/2014 | Isbjornssund .......... B33Y 50/00 705/310 |

OTHER PUBLICATIONS https://www.html5rocks.com/en/tutorials/eme/basics/, Sam Dutton, EME WTF? An introduction to Encrypted Media Extensions, Jan. 16, 2014.
https://blog.eltrovemo.com/600/how-to-build-a-nethix-like-multiscreen-ott-service-part-1/, Nicholas Weil, Feb. 13, 2012.
https://www.cs.princeton.edu/courses/archive/fall16/cos561/papers/NetFlix12.pdf, Adhikari et al., Unreeling Netflix: Understanding and Improving Multi-CDN Movie Delivery.

* cited by examiner

600

| Acme-Research.com | Secure File Services | -- ☐ X |
|---|---|---|

Monitor File Section | New | Open | Save | Save As | Print | Send | List — 604

| Select Files to Protect | Access | Program | Security | Method | Done |
|---|---|---|---|---|---|
| 1: PatientZ_Info.txt | Read | Any | ComputerName | Anytime | √ |
| 2: PatientZ_Hist.soft | Read, Add | SoftClinic | ComputerName | Anytime | √ |
| 3: PatientZ_xray.ayc | Read, Print | Aycan X-Ray Printer | Serial # 1 | 128-A4 | √ |
| 4: PatientZ_mri.mri | Read, Print | MRI Scan Viewer | SecurID | Just-in-time RSA-Token2 | |
| 5: PatientZ_Liver.bio | Read, Print | BioReactor Grower | DNA-Check | Just-in-time Genotyping-G3 | √ |

606, 608, 610, 612, 614

Monitor File Actions — 616

Maintain Constant Secure Connection: (Y or N)
Source Location: www.acmeresearch.com — 618
Access Rules Encryption: Use Auth Access Key | Get Encryption Key — 620

Security Section | Generate Key | Add Serial # | Input RSA Token | Upload Key — 630

Authorization Access Key: 1988AZenMan    Generate Key – Move Mouse:
                                              Percent Complete -->  | 90% | — 632
634
Method to Get System Attributes: Run Harvest Program / Manual Input
Input Serial 1: 3579-ABC-ZZ — 638
RSA SecurID Key Provided: Unit 2: 'AZB-158B9' — 640
Computer Name: HospitalA-Office123-Admin — 642

Generate Actions — 650

File Encryption Key Uploaded? - Y or N — 652
Merge with File Access Monitor – Y or N
Need to Sending Files Immediately? Y or N
Output Access Rules Filename: PatentZ_Medical_Records.rule

FIGURE 6

SYSTEMS, DEVICES AND METHODS FOR PROTECTING AND EXCHANGING ELECTRONIC COMPUTER FILES

FIELD

Embodiments relate to the protection of electronic computer files ("files") and the subsequent exchange, access and manipulation and use of said files. In those situations where file owners wish to exchange files with another party the system ensures files are authenticated, not illegally copied, stolen or damaged by hackers or misused in a way that is outside their intended use.

INTRODUCTION

Computer files are growing to represent an ever widening scope of information covering virtually every area of our daily lives. Many of these files are highly valued by the owners or originators and can contain intellectual property (IP), they can hold important confidentially information or they can hold important personal information. Computer files can carry a wide range of digital information, for example encoded programs and applets, images and pictures, music and sound, data, designs, medical data just to name a few. Computer files guide our navigation systems and will soon drive our autonomous vehicles and autonomous delivery systems. Similarly, 3D printing is expanding to the point where any 3D object can be placed into a 3D scanner and output as digital computer files that represent the original object. 3D designs and architectural designs hold valuable IP and copyright value as they can take months or years to generate. All of our medical records and financial information are kept in electronic files. The owners of these files often want to transfer them between computer systems to allow them to be viewed, manipulation and even replicated into physical objects, for example in the case of 3D object files. Electronic mail systems, storage drives, portable storage and mobile devices allow the transfer of all forms of electronic files. Design systems like Computer-Aided Design (CAD) systems allow the viewing and manipulation of advanced 3D designs. Hospital management systems can allow for the generation, exchange, manipulation, printing and viewing of confidential medical records. Full length movie files in formats like MP4, MKV, MOV and others cost many millions of dollars to make and the creators of these movies need to recoup their money back for this investment. There are now complex growing systems that require specific growth-design file to produce a perfect growing cycle for all kinds of foods, plants and medical and commercial marijuana products. These and other advanced computer systems touch every aspect of our lives with the sensitive electronic files they generate and exchange. There is a need for methods to protect any electronic file and the use and manipulation of these files to help protect the intellectual property rights of the owner and to ensure confidentiality for example. There needs to be a method to detect a counterfeit copy of any given file and to ensure authenticity, reliability and quality can all be substantiated.

Protection of intellectual property (IP) rights and ensuring confidentiality can take several forms. When protecting IP rights a licensor can grant an allowable use of the electronic file to the licensee. When protecting confidentiality signed agreements are often used to allow the exchange of information, especially in the medical profession. The growing complexity in computer technology and software systems requires an equally complex system to protect exchange, use and manipulation of these files.

Various systems are in place to protect files today, such as DRM based systems. These systems are designed to exchange a collection of files from one captive system to another captive system, where the destination program opening the file is controlled by the licensor. For example electronic gaming files, video viewing systems and music streaming systems can only be played on known systems and files received, installed and played get authentication from a central server. Another DRM strategy is to use product keys to open or access a file. Once opened the user has easy access to do a range of activities on the files with little restriction. With medical records, 3D scans, architectural designs and 3D designs there is no protection mechanism in place to safeguard these files at advanced levels. Such protections are already needed for example as researchers start attempting to replicate human organs and blood vessels using 3D designs, which is already taking place. This example involving human lives highlights the importance of having a strong, secure system in place to stop malicious use and abuse around the exchange of these electronic files. There is a need to have a secure method of exchanging specific electronic files that can safeguard intellectual property rights and confidentiality rights, or at least an alternative. Most online Internet streaming systems today treat all files equally and their protection systems do not focus on different protection for different groups of files. There is a need for a security method that creates strong security protection of individual files and groups of related files. There is also a need for a secure method that can ensure when these files are reproduced, as in the case of a physical printout of someone's x-ray file, or a 3D printed physical object for example, that both the quality and integrity of the printed output is accurate and represents exactly what was intended by the licensor. For example, when printing human cells into organs there is an urgency to confirm that a replicated 3D object will perform as required or desired, and that the replica has the quality and integrity of the original. Additionally the files related to this organ must be authenticated uniquely as directly related to the intended recipient. The problem of detecting counterfeit 3D scans, X-rays, MRI scans, 3D designs files and other such important files must be addressed. As another example, when printing components for a machine or medical device there may be a need for a warranty, and the like. Other protection solutions use policy managers to limit a workstation and all activities on that workstation. The policies can be tied to a user of a corporation and it limits what a user can do based on their role in the corporation. These types of systems are not suited for managing one specific digital file asset as it is transferred, sold, moved and manipulated from one system to another system. They are designed to protect an entire workstation and their security apparatus is not directly tied to an individual file or a set of closely related files.

Transferring and manipulating electronic files across a public network like the Internet usually involves encryption. Encryption technology like Secure Socket Layer (SSL) can be used to secure financial transactions, for example. SSL could be used to deliver important electronic files between two parties, but can have shortcomings. Digital Rights Management (DRM) solutions can be used to prevent illegal copying of files. But these systems might not work as intended and can even result in an increase in illegal use. Systems like SSL and DRM might not limit the number of copies that could be made of an electronic file, does not prevent hackers from reaching into a system and taking or damaging a file, and there is no ability to limit the number of 3D objects that are physically 3D printed after the file is downloaded. A system is needed that provides multi-phased security system for highly valued files. Such a system needs to provide both authorization and authentication before allowing access and use of such highly valued files.

SUMMARY

In an aspect, embodiments described herein provide a method of protecting one or more files using a file access monitor logic and one or more qualifying steps. The method involves, at a server, encoding file access requirements related to one or more files into access rules, the access rules being machine readable instructions for a file access monitor, executing the file access monitor logic in an accessing computer system; using an authorization access key to authorize access to the access rules; upon successful authorization, gaining access to a first encryption key to decrypt the access rules; using one or more system attributes provided by the accessing computer system to authenticate access to the one or more files; upon successful authentication, gaining access to a second encryption key to decrypt the one or more files; controlling activities of the accessing computer system upon the one or more files by the file access monitor reading the access rules; and upon determining that active file access of the one or more files by the accessing computer system is complete, using the first encryption key to encrypt the access rules and using the second encryption key to encrypt the one or more files, wherein the access rules and the one or more files are decrypted only during the active file access by the accessing computer system. In an aspect, embodiments described herein provide a computer program product with computer recordable storage medium having stored therein computer executable program code, which when executed by a computer hardware system, causes the computer hardware system to perform the method.

In some embodiments, the authorizing access provides the decryption key for the access rules.

In some embodiments, the authorizing access requires real-time confirmation of the authorization access key by a server.

In some embodiments, the authorizing access involves providing one or more biometric inputs, random numbers or predetermined strings.

In some embodiments, the system attribute for authentication comprises the use of one or more machine attributes, device attributes or biometric attributes.

In some embodiments, the device attributes can be generated by physically inputting a random number generated by a physical device, cell phone, tablet or wearable computing device.

In some embodiments, successful authentication results in the system attribute being sent to a server for verification.

In some embodiments, after successful verification the second encryption key is returned to decrypt the one or more files.

In some embodiments, the authentication involves using the one or more system attributes as the second encryption key to decrypt the one or more files.

In some embodiments, gaining access to the first encryption key to decrypt the access rules involves extending the authorization access key and modifying the authorization access key to produce a larger encryption key.

In some embodiments, producing the second encryption key to decrypt the one or more files involves extending the one or more system attributes and modifying the system attributes to produce a larger encryption key.

In some embodiments, the system attribute for authentication is gained through accessing and identifying material to be used during the process of accessing the one or more files.

In some embodiments, the material to be used is DNA material in the form of human cells.

In some embodiments, the identification of the material is achieved by sequencing human genome material used for authenticating the one or more files.

In some embodiments, the identification of the material is achieved by using genotyping to identify unique DNA material used for authenticating the one or more files.

In some embodiments, the identification of the material is achieved by using a specific portion of the DNA sequence for authenticating the one or more files.

In some embodiments, the encrypted access rules are merged with the file access monitor before executing the file access monitor logic in the accessing computer system.

In some embodiments, a checksum is first created and added to the access rules before they are encrypted and sent to the accessing computer.

In some embodiments, after the real-time confirmation of the authorization access key, the first encryption key is used to encrypt the access rules before they are transferred to the accessing computer.

In some embodiments, after the system attribute is verified by the server, the second encryption key is used to encrypt the one or more files before they are transferred to the accessing computer.

In some embodiments, the encrypted access rules and encrypted files are in a single file that is separated by the file access monitor.

In some embodiments, the access rules provide a list of required 3D replication machines that can be used to replicate the one or more files.

In some embodiments, the access rules provide the number of 3D replications that are allowed to be created on the accessing computer system.

In some embodiments, the authorization and authentication process provides the lifespan of the one or more files.

In some embodiments, the encoding includes an indicator that requires a constant, real-time connection to be opened to a trusted computer when any access is taking place on the one or more files.

In some embodiments, the encoding includes restricting the operating system and version required for programs wanting to access the one or more files.

In some embodiments, the encoding includes a unique download method for each of the one or more files when access is requested.

In some embodiments, the executing of the file access monitor involves running a user interface portion and a system level portion that does not terminate.

In some embodiments, the file access monitor logic can be run within another program resulting in protection of the one or more files.

In some embodiments, the executing of the file access monitor logic results in gaining access to the one or more files using a just-in-time decryption procedure.

In some embodiments, the executing of the file access monitor logic results in the encryption of all derivative copies of the one or more files.

In some embodiments, the decrypting and accessing of the access rules provides a file name to be used by the file access monitor that can sequentially change.

In some embodiments, the sequentially changing file name allows for an infinite number of similarly encrypted files to be exchanged for access by the file access monitor.

In some embodiments, the file access requirements are operational parameters defining permitted activities by the accessing computer related to the one or more files.

In some embodiments, the file access monitor is a computer application that is installed on the accessing computer system and, upon execution, continuously runs in the background.

In another aspect, there is provide a method of protecting one or more files using a file access monitor and an authentication step. The method involves at a receiving computer, receiving encrypted access rules, the access rules encoding file access requirements related to one or more files, the access rules being machine readable instructions for a file access monitor; executing the file access monitor logic; detecting the presence of an authorization access key to authorize access to the access rules; receiving an authentication method from the authorization access key; decrypting the access rules using a first encryption key; using a system attribute to authenticate access to the one or more files; upon successful authentication, accessing a second encryption key to decrypt the one or more files; and controlling activities of the accessing computer system upon the one or more files by the file access monitor reading the access rules.

In some embodiments, the access rules provides a list of programs and their permissions that are allowed to access the one or more files.

In some embodiments, the access rules provides a list of required 3D replication machines that can be used to replicate the one or more files.

In some embodiments, the access rules provides the number of 3D replications that are allowed to be created on the untrusted computer system.

In some embodiments, the encoding provides the lifespan of the one or more files.

In some embodiments, the encoding provides retaining the network address of the trusted computer to enable communications.

In some embodiments, the encoding includes attaching an encrypted copy of the one or more files into the access rules.

In some embodiments, the encoding includes adding customized restrictions tied to the list of programs allowed to access the one or more files.

In some embodiments, the encoding includes an indicator that requires a constant, real-time connection to be opened to the trusted computer when any access is taking place on the one or more files.

In some embodiments, the encoding includes an indicator that provides the smallest amount of available memory available within the operating system for programs wishing to access the one or more files.

In some embodiments, the encoding includes restricting the operating system and version required for programs wanting to access the one or more files.

In some embodiments, the encoding includes a download method when accessing the one or more files.

In some embodiments, the download method includes streaming portions of the one or more files.

In some embodiments, the method involves installing of the file access monitor includes the extraction of the encrypted one or more files.

In some embodiments, the executing of the file access monitor by running a user interface portion and a system level portion that never terminates.

In some embodiments, the executing of the file access monitor results in gaining access of the one or more files using a just-in-time decryption procedure.

In some embodiments, the executing of the file access monitor results in the encryption of all derivative copies of the one or more files.

In some embodiments, the decrypting and accessing of the access rules provides a generic file name to be used by the file access monitor that can sequentially change using a known method.

In some embodiments, the sequentially changing file name allows for infinite number of similarly encrypted files to be exchanged for access by the file access monitor.

In some embodiments, the file access requirements are operational parameters defining permitted activities by the receiving computer related to the one or more files.

In some embodiments, the access rules comprises a set of operational parameters that are selected to define permitted activities by the receiving computer related to the one or more files, the access rules readable by the file access monitor to control access to the one or more files by the receiving computer.

In some embodiments, the file access monitor is computer application that is resident on the receiving computer and continuously runs in the background.

In some embodiments, the verifying comprises receiving a file access key, the file access key being linked to the decryption key.

BRIEF DESCRIPTION OF DRAWINGS

The following detailed description of the invention is better understood when read in conjunction with the included figures. The included figures are intended to illustrate one implementation of the invention for one skilled in the art. These exemplary illustrations are not intended to limit the disclosure to the specific embodiments shown herein.

FIG. 6 is an illustration of a first embodiment showing a programmatic interface that would be used by the file sender to prepare access rules for delivery to an accessing computer.

DETAILED DESCRIPTION OF DRAWINGS

Figure 1:
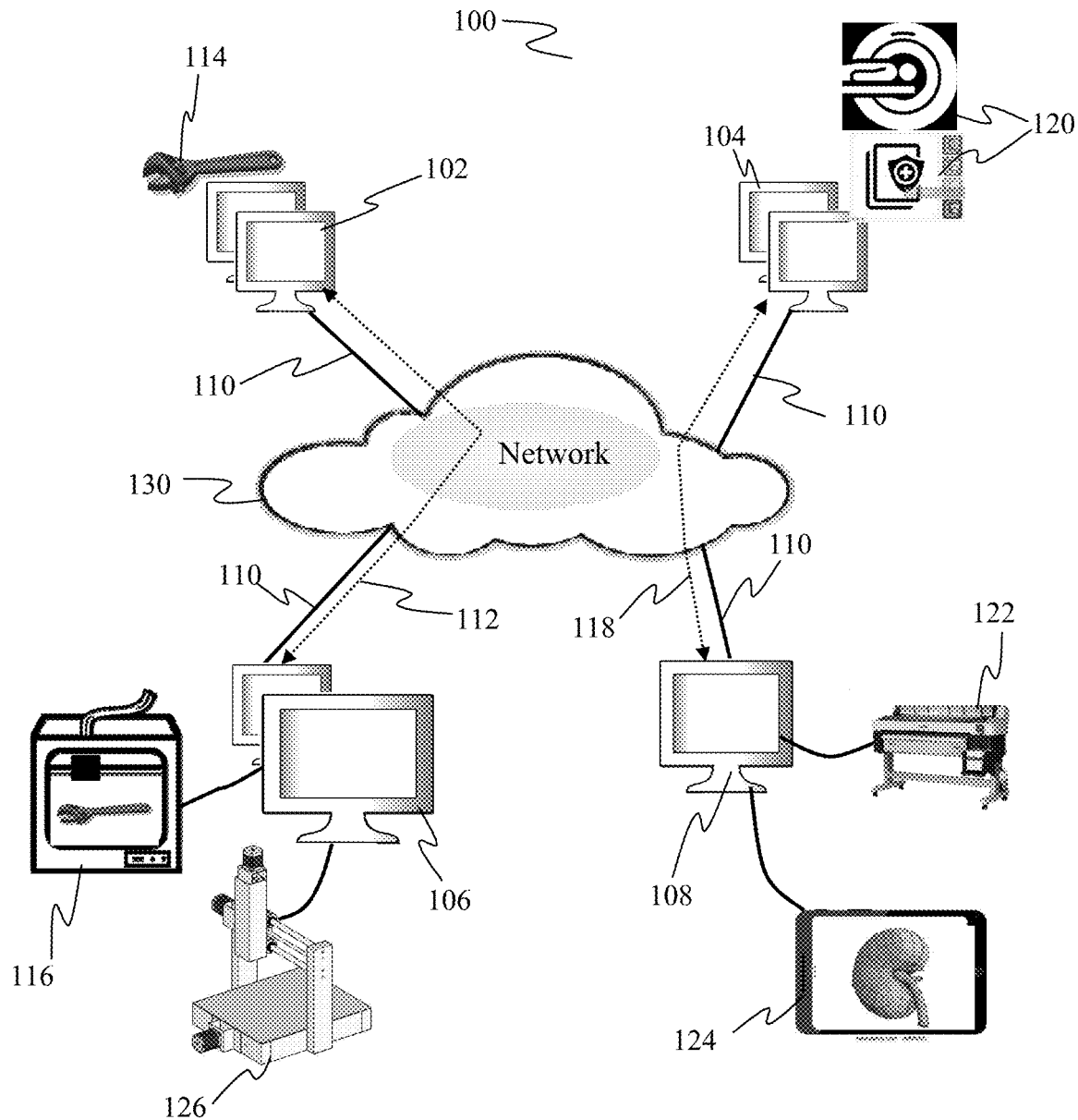
FIG. 1 is an illustration of a network overview showing several relationships between an electronic file owner or licensor and the electronic file user or licensee.

Embodiments described herein provide a system and method for controlling access to electronic files by linking the files to a file access monitoring system, called the file access monitor in this application. The file access monitor then authorizes the use of the one or more files by performing one or more qualifying steps on the accessing computer system. The file access monitor may be a standalone program or an embedded logic within a closed system like an application, an operating system (O/S), an external device like a printer, a web browser or a web browsing application. Access to electronic files can include the exchange, modification, execution, printing, viewing, listening, copying and replication of these files to name a few. A given protected electronic file is transferred from a sending computer system to a receiving computer system for eventual access. The receiving computer may also become the accessing computer should a user on the receiving computer wish to access the transferred file. To access a given protected file one or more qualifying steps must be performed to grant access and to unlock the file. In some cases the qualifying step involves a specific activity called a system attribute identification process.

During the period of active file access the file access monitor logic keeps tight control over how the one or more files are uses. During this period the file access monitor is programmed to be unstoppable and cannot be terminated and removed from the system. Active access is indicated through maintaining an open status within the file system managed by the specific operating system (O/S) being used to access the files.

Some O/S programs also use open status flags and other similar mechanisms to determine what files are open so they can manage file sharing and avoid file use collisions between different programs. In some cases multiple programs could be using different protected files so all programs and all open status values must be watched and managed. When allowed by the owner some programs might be allowed to make changes to the protected files. The file access monitor encrypts all derivative copies of the protected files to ensure the original intellectual property continues to be protected.

Once all files enter a closed status and their active use flags are turned off by the O/S the file access monitor logic can be terminated.

The step of inputting the authorization access key results in 'directly decrypting' the access rules to confirm you are authorized. The authorization access key can be sent back to the server for verification and this results in the sending of the decryption key.

The one or more system attributes can be used directly to decrypt the files—so intrinsically linked. In some embodiments, the system attributes are sent back for verification and a decryption key is received.

By way of example, embodiments described herein provide a system and method for exchanging 3D design and 3D print files for replicating a 3D object and ensuring the person accessing the files is authorized to do so. It can also authenticate that the machine performing the replication is the correct one, it will not produce a counterfeit copy, that there are legal copies remaining for 3D replication and that the 3D replication machine being used is ready for operation. By way of another example, embodiments described herein provide a system to ensure that navigation data being sent to an autonomous vehicle or autonomous delivery drone reaches the correct vehicle and the vehicle is in a state to receive and process the data. Such systems might require one or more authentication steps to ensure the correct driver is in the autonomous vehicle and the correct vehicle is being driven. By way of further example, embodiments described herein provide a system to ensure that a 3D scanned body organ, like a kidney can be protected by the person owning the kidney. Such a 3D scan can then be uploaded to third party 3D organ printing site for replication. Such replication must clearly be authorized by the future recipient, the 3D printer must be authenticated to ensure it contains the correct human stem cells for replication or the recipient could die. In another embodiment advanced virtual reality (VR) files targeted to very expensive VR headsets need protection, confirmation and authentication as they are transferred from the creator of the file to their target users. By way of another example a large growing operation have specialized computer-based growing machines that take growth-design files to direct the machine to the exact best methods to grow specific products. Such products as foods, plants, medical and commercial marijuana to name just a few. These computer systems also produce lots of output on the success of these growth-based design files. These files must be protected, they must reach a specific machine and the file should not be tampered with. With this innovation the authorization at the start of the growth cycle allows for a safe start, but the authentication ensure that the correct files are reaching the correct machine. If there are hundreds and hundreds of these machine operating in single grow location safe-guards must be in place to protect these growth files so a good crop yield is achieved. Some embodiments may relate to access of electronic files in order to modify or customize the electronic file in some way. Other embodiments may relate to the access of electronic files in order to create a replica of the item it represents, as in the case of electronic files that represent a 3D object, or that represent a physical x-ray scan. Other embodiments may relate to the access of movie file where it may be authorized to play only on one specific projector by a specific movie theatre or a VR movie file that will play on a very specific VR headset. Other embodiments may require a set of music files be played only on a given authenticated computer system that was licensed for this purpose. And others files are designed simply to guide a computer system through a series of steps and procedures over a long period of time, for example in growing products in a closed system.

The system and method can address concerns around security, modification allowances, external tampering, counterfeit detection and quality assurance. The system and method can benefit the rights holder by providing advanced protection for their intellectual property. The system and method can protect the licensee who acquires the rights to access the electronic file and has expectations around a given quality, accuracy and reliability of the contents of the file. The system can provide a multi-factor authorization and authentication to reduce theft, hacking, counterfeiting and illegal copying of electronic files. Unlike other systems authentication is linked to the file itself and not a particular person. This allows the file asset to be transferred several times from computer system to computer system. This then requires the associated authorization and authentication processes to be present in the final accessing system. In some embodiments this would require the updating of authentication information to allow the final accessing computer system the ability to successfully access the files. In some embodiments the system can provide feedback at all stages of access, modification, printing and reproduction to track success or failure and to allow for audit, statistical and analytic information to be collected and to be reported back to the licensor and authorized third parties which may include regulators. Analytic information can be further enhanced by correlating the original electronic file information provided by the licensor with the completion data provided by the authorized file access monitor.

Embodiments described herein can encode file access requirements, authorization requirements and authentication requirements for one or more files into access rules understandable by the file access monitor. The access rules can be operational parameters defining permitted activities by the accessing computer related to the one or more files. These requirements can also be encoded and encrypted within the file access monitor to guide its behaviour and actions in specific ways. In these embodiments the parameters become a part of the file access monitor and are not a separate file that must be moved separately. Each protected file is treated uniquely and in some cases the same authorization and authentication process can be used for a set of related files. For example if a specific human organ for one individual requires three files to define different parts of the same organ they might use a similar authorization and authentication process.

The access rules can include a set of operational parameters that are selected to define permitted activities by the accessing computer related to the one or more files. The access rules can also include directions as to how authentication is to be performed and which system attributes are required to gain access to the one or more files. The access rules are readable by the file access monitor to control access to the one or more files by an accessing computer. The access rules can be coded in a language that is readable and compatible with the file access monitor. In various embodiments the access rules can either be encoded within the file access monitor, they could be collected into a file for exchange or they could be encoded into a database record for retrieval by the file access monitor when needed. In those embodiments where the access rules are merged with the file access monitor they can be pre-encrypted and placed in a known location within the file that contains the file access monitor program. Such methods of concatenating information into a single transferable file provide an added convenience level when transferring information between systems.

For example, a programmatic interface (PI) can display a series of access parameters. These access parameters can be selectable by a user using the PI. The PI can encode the selected access parameters to generate access rules and subsequently encrypts the access rules. The PI can set constraints around values of the access parameters, so that the user can select the access parameters within the range of constraints. The access parameters can be strings like file names, program names, encoded permissions, and can also include the actual files in some embodiments. The access rules can be proprietary between the PI and the file access monitor. The access rules are encoded to be readable by the file access monitor.

The file access monitor is computer logic that is resident in the accessing computer system. In some embodiments the file access monitor is received and installed on an accessing computer. In some embodiments upon execution the file access monitor continuously runs in the background to control access the one or more files by an accessing computer. In other embodiments the files access monitor is started and stopped each time the user wishes to access the protected files and only when the file access monitor is active in the system can the protected files be accessed. In yet other embodiments the file access monitor can be embedded within an application like a web browser or a computer program like a computer aided design (CAD) program or a 3D slicer application. In other embodiments the file access monitor can be encoded into a specific machine, like a 3D printer, an X-Ray machine, an autonomous vehicle, a delivery drone, a plant-based growing computer system, an MRI machine, a music player or a movie projector. The file access monitor can be a compiled program with a visual UI behaviour. The file access monitor can be a linked procedure within a larger program with embedded controls and menu selection controls inside of the larger application. The file access monitor can stay resident on the accessing computer system and runs in the background to control access to the files by reading the access rules.

A server or the PI can encrypt the access rules for provision to the accessing computer system. The term qualifying steps will be used to denote the multifactor process of both authorizing and authenticating the use of the one or more files. The access rules are protected using both authorization and encryption techniques leading to the eventual access of the protected files. The files themselves are protected by authorization steps, encryption steps and a further authentication step. These qualifying steps can be considered multifactor and can be shared between the file access monitor and the qualifying process on the accessing computer. During the configuration process using the PI the qualifying steps are defined for the access rules and the one or more files. In some embodiments the PI collects authorization and authentication information which is later used in the authorization and authentication process. In some embodiments the PI may also allow for the configuration of the method used for the authentication process.

The term authorization is used to denote a process or confirming the legal right to access the one or more files. In some embodiments authorization provides an identification of a person or individual who has directly acquire legal rights to access the one or more files. In this application the qualifying step of inputting a value for authorization will be termed using an authorization access key (AAK). In some embodiments the authorizing step includes both inputting of an AAK value, biometric scans and other steps. In these embodiments the input can include known phrases, various biometric scans, secure tokens (like a security token), secure USB tokens, Bluetooth security, Smartphone near field communication (NFC) techniques and many other steps. The step of authorizing the user at the accessing computer leads to the decryption of the access rules.

The term authentication is used to build confidence that the overall system accessing the files is authenticated and verified to be accurate and capable of correct file usage. This step is used to ensure quality, strengthen reliability and confirm authenticity. Authentication is achieved using system attribute information. A system attribute can include a value within the accessing computer system, an attached peripherals on the accessing computer, a held or worn devices that provide random numbers, some form of biometric data or even human DNA data to name a few. For example system attributes can include areas like computer system internal identification values, license key information, hidden system attributes, system strings and internally created random numbers to name a few. Attached peripherals and devices can include machines like printers, scanners, projectors, music players, 3D printers, MRI machines, X-Ray printers, infrared sensors, heat sensors, photo sensors, plant-based growing systems and others. Handheld and worn devices can include physical security tokens with constantly changing random numbers, or random number generation software on a mobile device or cell phone carried by a person who holds the license rights to access the file. In one example a file that contained a 3D scan of a specific person's kidney who wanted to get a replica made they would want a high level of confidence that the resulting replica is authentic and was created using their own stem cells. In other example a file containing navigational directions for an autonomous vehicle would like to authenticate the vehicle that is being given the file to read for directions is the correct vehicle and is therefore in the correct country, state, city and region of the world. For example in some embodiments the physical machine's serial number, or part of the serial number could form part of the decryption sequence along with some or all of the information collected from the authorization step. In other embodiments the physical machine might have a constantly changing random number that can be verified and then used to decrypt the one or more files. In yet other embodiments the material to be used in conjunction with the one or more files might contain an authentication marker. For example if the material to be used were stem cells from a human being, these can be checked using various external means with a parallel system that feeds the DNA material into the print heads for the 3D printer or DNA incubation machine. Initially a fast method could be built into the file access monitor for using DNA material. For example a quicker method could be to select just part of the DNA genome sequence. Alternatively one of many genotyping methods could be used to select a unique signature or part of the DNA sequence. Eventually computer speeds will allow a larger and larger part of the human genome sequence to be used to authenticate the 3D printing machine or DNA incubation machine to be used and decrypt the one or more files containing the 3D representation of the person's organ.

The encryption employed by the system can be implemented through various techniques using methods like pre-established encryption keys or negotiated encryption keys and other methods. In some embodiments license key servers can be used to manage keys and provide keys. In these embodiments public and private encryption. The system is flexible enough that even newer methods of encryption using Quantum-safe encryption techniques can be utilized to ensure very high levels of encryption safety. Since encryption keys are never stored in permanent computer memory they can be extremely hard to break and with Quantum-safe encryption methods could be considered unbreakable. In some embodiments encryption of the access rules and the one or more files will use different techniques and the steps of encryption and decryption will happen at different times. In other embodiments the encryption of the access rules and the one or more files will use the same techniques and happen at the same time. For example this might be true when using time consuming methods like Quantum-safe encryption methods, or when a License Key Server is involved. The encryption technique used on the access rules and the one or more files is shared between the PI and the file access monitor. This is because the PI or server must encrypt the access rules and the one or more files so that the file access monitor can subsequently decrypt the access rules and the one or more files.

Several encryption techniques used on the access rules and on the one or more files can be programmed into the file access monitor. In this way a file access monitor can provide a wide range of flexibility to deter different forms of hacker attack and counterfeiting attempts. The user must first provide an authorization access key (AAK) to assist in confirming they have rights to access the protected files. For example the PI might be given a AAK that will be directly used in some way to encrypt the access rules. In another example the file access monitor submits a personalized AAK to the PI or server in order to retrieve a different encryption key to decrypt the access rules. Similar encryption decisions can be made for the one or more files when dealing with the system attribute. In some embodiments this also allows the use of a License Key Server that is external to the PI or server. There is a lot of flexibility when deciding how to protect the access rules and the one or more files. In other embodiments the access rules and one or more files are only encrypted and downloaded once a verified AAK is provided. For example a cyclically changing random number is used at the accessing computer like a security token, and this is provided back to the PI or server for verification and for helping to encrypt the access rules. In some embodiments complex methods are used to limit the duration of access, for example since the encryption key is not stored in long term memory but kept only in RAM and is only valid for 'X' minutes for decrypting the one or more files. Once the file access monitor is terminated the encryption key is lost and a new request must be made for a new copy of the encrypted files.

Once the qualifying step of authorization is complete there are several embodiments for proceeding to access the one or more files. In one embodiment passing authorization leads to the just-in-time encryption of the one or more files just before they are downloaded to the accessing computer. Only after the one or more files are present on the accessing computer can the qualifying step of authentication take place against the target piece of hardware, called the system attribute in this application. In another embodiment passing the authorization step leads directly to acquiring the system attribute to assists in the decryption process. In some embodiments the one or more files are decrypted using some of the data collected during the authorization step and additional system attribute data collected as part of the authentication step. The system and method is flexible enough to handle many different embodiments depending on the design of the system and the different importance levels of any given file. In some embodiments the system attribute information is harvested from the accessing computer. For example the user simply has to run a web browser extension and it interrogates the computer system to retrieve a hidden piece of system information. In another example a program is run that looks at attached physical devices and gets license or serial number information from a printer, DNA incubator, X-Ray Printing machine or some infrared printer monitor to name a few. This harvested information is then provided to the PI or server to use when preparing the one or more files for delivery. In other cases the user must have or acquire a random number generator computing device, like a security token, or a piece of security software running on a mobile device or some other mechanism that can be used. In this embodiment a just-in-time encryption strategy would be used to negotiate an encryption key based on the confirmed random number value.

The accessing computer requires direct access to the file access monitor to gain access to the protected files. In some embodiments the accessing computer can execute the file access monitor as a program where it will run continuously in the background providing file access services. In other embodiments the file access computer starts and stops as needed for accessing the protected files. In other embodiments the access computer can execute the file access monitor logic within another program or within the operating system (O/S) where it provides continuous support for accessing the protected files. In some embodiments the file access monitor runs in the background to provide access and monitor usages of the files and does not provide direct manipulation or modification of the files. In some embodiments the file access monitor can also be embedded into another attached computer system, like a 3D printer, a DNA incubator or many other types of external system monitoring devices. In some embodiments 3D monitoring devices are used with infrared sensors, heat sensors or other sensors to detect the quality of a 3D replication being created by a 3D printer. Such 3D monitoring devices can be connected via USB, Bluetooth, WiFi or other methods and communicate to the file access monitor. The file access monitor provides services for the accessing computer such that the files can be used in particular ways depending on the owner's configuration within the access rules and in conjunction with the file type and the normal file usage for a file of that type. The file access monitor verifies the rights of the accessing computer through several qualifying steps. This verification can by implemented using one or more authorization and authentication techniques, called qualifying steps within this application. In some embodiments the accessing computer can interact with the server or PI in response to the qualifying steps. In some embodiment it might be necessary to perform additional qualifying steps beyond just authorization and authentication. For example there could be additional biometric scans required, or additional verification steps to ensure additional licensed copies remain for a given 3D replication. In some embodiments there could be additional communications performed by the file access monitor to retrieve the encryption key depending on the configuration done with the PI. In other embodiments the local authorization and authentication process will provide enough unique data to act as a decryption key for the access rules and the one or more files.

The access rules and one or more files are decrypted in random access memory (RAM) and not on the hard drive so that the access rules and files cannot be tampered with. In this embodiment the decrypted access rules and files can only be in RAM and only the encrypted access rules and files may be on the hard drive, for example. In some embodiments there may also be a checksum created of the access rules before they are given to any accessing computer. Similarly a similar checksum method could be used for the files, but this would have to be removed before the files were accessed by any program. These checksums can then be checked each time the access rules or files are opened and decrypted. In these embodiments the access rules and files can have a checksum created by the PI before it is encrypted so that the access rules cannot be tampered with in their encrypted state.

Turning to FIG. 1 there is an illustration of an example network overview 100 showing several relationships between an electronic file owner or licensor and the electronic file accessor or licensee. For convenience in this application we will call the source of the electronic file the "file sender"; acting directly as the licensor or a proxy for the licensor. Although it could be true that not all exchanges of electronic files involve formal licensing agreements, this application assumes that a person or individual who is exchanging a file, over which they have ownership, do want it protected and guarded. The file sender of this file or file asset is assuming that theft, damage, tampering, illegal copying, counterfeiting or illegal viewing are all possible to this file and such malicious activities would harm them in one or more ways. The step of formally agreeing to protect another person's intellectual property can be forgotten but copyright protection is implied under law when proof of ownership can be demonstrated. So in this application the term file sender or licensor will broadly apply to any person on a computer system who has ownership of an electronic file and wishes grant another person access to the file, called the "file accessor" or licensee in this application.

In FIG. 1 the file senders 102, 104 have electronic files 114, 120 that they wish to transfer. One set of electronic files 114 might be one or more design files that represent a physical object like a wrench 114 capable of being 3D printed on a 3D metal printer. Another set of electronic files 120 might be a set of medical files containing detailed reports, CRT scans, MRI scans, x-rays, patient histories and other components for a given patient. In some embodiments the MRI scans 120 could be converted into a 3D image of a body part, like skin, windpipes, blood vessels and bones. The scan could be for prosthetic connection points for building an advanced prosthetic limb. Eventually these scans will be for simple organs like bladders 124 and stomachs and eventually advanced organs like kidneys and hearts. Both types of electronic files are sensitive, contain IP and confidential information can be protected. There are a multitude of other examples for example future navigation and control data going to self driving cars or delivery drones has to be carefully controlled to ensure the correct car or drone receives the data, the data isn't been tampered with and the car is in a ready state to upload, use and store the data. In another commonly occurring example both music and video files often have single and multiple licensing regulations that are complex and difficult to work with. Music and video files are routinely copied and intellectual property stolen easily by the general public. Authorizing and authenticating who is allowed to play a specific video file and what projector is allowed to play the file can help ensure IP is respected and assist in blocking illegal copying and counterfeiting. Similarly one or more music files might be authorized and authenticated to play on one specific machine based on the system attributes of the accessing computer. In other future example it will be important that electronic scans of a person's dental information is correctly received, processed and given to the machine that will be reproducing a tooth implant that is to be generated by the electronic file.

In FIG. 1 the 3D object files 114 are intended for a licensee or file accessor 106. In one embodiment the file 114 are sent along a communication path 112 over a network 130. The network 130 could be a public wide area network 130 like the Internet, it could be a public wireless network like GSM, GPRS, LTE, 4G, 802.11 (WFi) type of network. It could also be an Internet of Things (IoT) network with various large and small IoT entities communicating over a common network. Each endpoint is connected 110 to the network 130 using various methods like Ethernet, WiFi protocols, wireless RF protocols or many other high speed connection methods. In other embodiments the file 114 could also have been sent using other means like physical USB memory devices, storage media, Bluetooth connection, Near Field Communications (NFC) or alternative methods. However the files 114 were received by the file accessor 106, 108 they can go through several qualifying steps using a multi-factor authorization and authentication process required by the invention. In some embodiments several of these steps can take place over connection 112, 118. In these embodiments the file sender 102, 104 has a web server ready to verify any authorization and authentication requests made so that access can proceed. In other embodiments when the file accessor 106, 108 is a stand-alone system the multi-factor security can happen locally on the computer systems 106, 108 and attached hardware components 116, 122, 124, 126. In these embodiments all activities on the one or more files are cached and saved on the accessing computer 106, 108 and relayed to the file sender 102, 104 using digital media, portable media, cell phone storage or other means. These steps are described in detail in subsequent figures.

Figure 2:
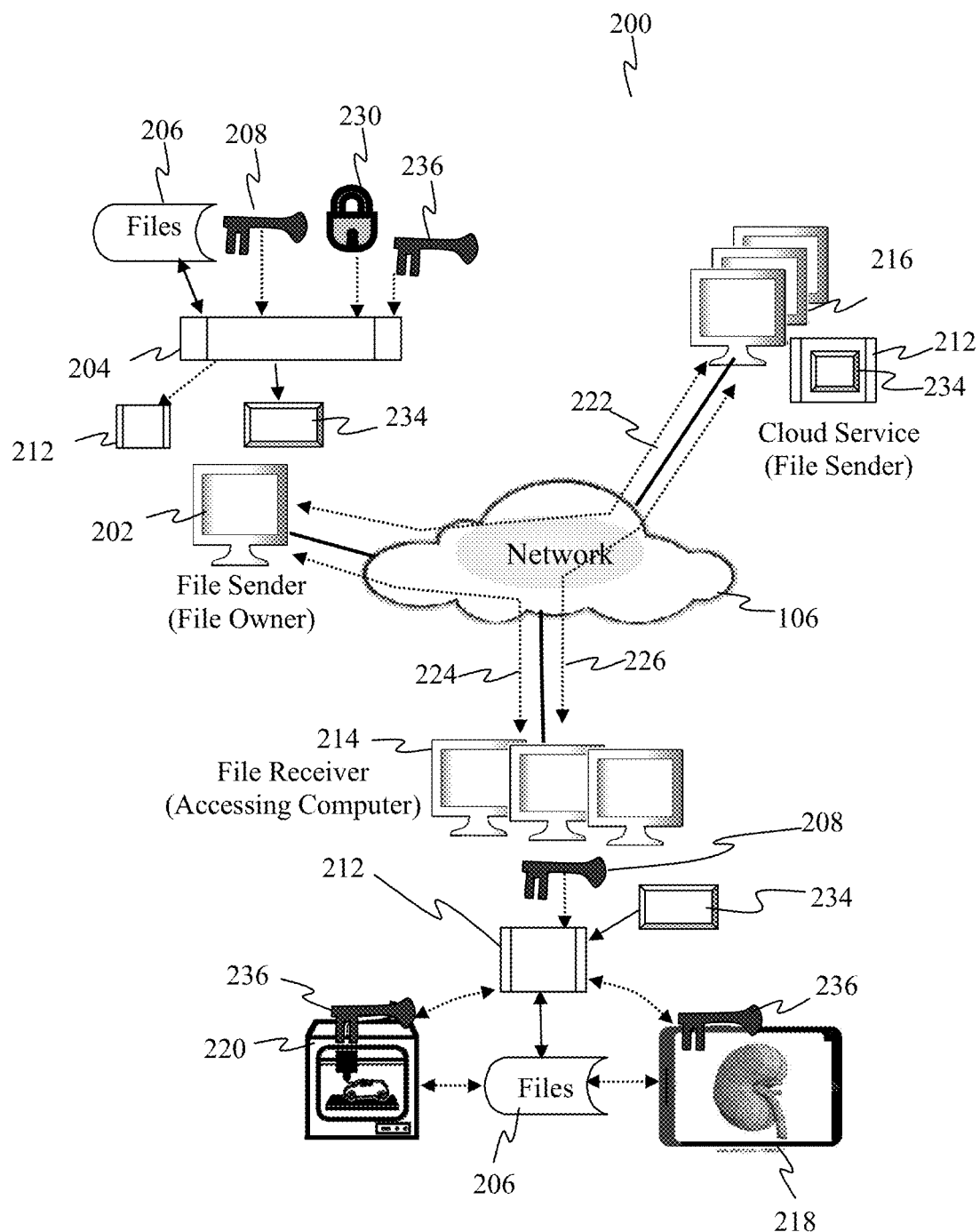
FIG. 2 is an embodiment illustrating the steps taken by the file sender of the electronic files and the actions required at the accessing computer to make use of the electronic files.

In the first embodiment the electronic files 114 are send from a licensor 102 to a licensee 106 for use in some way. The licensee 106 may have purchase rights to make one or more copies of the 3D physical object represented by the electronic files 114. The licensee 106 may be a 3D print on demand service, like the services offered by 3D Hubs a company with thousands and thousands of printing locations for offering a wide variety of CAD designing and 3D printing services on demand. In this embodiment the licensee 106 has a variety of 3D replication machines 116 and CAD services shown. In the second embodiment the electronic files 120 could contain a variety of medical records, highly confidential and covered by one or more freedom of information laws. They might be moving from one hospital 104 to another hospital 108 as a communication exchange 118. It could be moving from a hospital 104 to a doctor's office 108, or from a testing lab 104 to a doctor's office 108 for analysis and display. The patient might have gone to an advanced 3D imaging center 104 and the resulting files are to be sent to a destination organ growing location 108 offering bioreactors for growing skin or blood vessels. In some embodiments the files might not be licensed formally but an agreement of confidentiality and privacy is important to maintain. The licensee 108 might in this example be offering a service, like medical advice. The licensee 108 could be requested to modify or improve the file and add additional medical procedures and scans. For example the file accessor 108 might have devices for viewing the information, like desktop, laptop or personal digital assistant (PDA) type computers. In some embodiments the file accessor 108 might be attempting to recreate an extremely sensitive, urgent and personalized body part within an incubator called a bioreactor 124. There could be specialized medical software needed to view the files, ones that can recognize data, scans, x-rays, 3D MRI data and other such complex electronic files. The information might include electronic files that can be plotted on an advanced plotting printing device 122. Such an x-ray printing solution from Xerox called Aycan xray-print is available for such a purpose for easy transfer of important x-ray electronic files between locations. These solutions can be used when complex files are exchanged between parties that can only be viewed on specific machines or in specific ways. FIG. 2 details how the files are linked to access rules to ensure the correct limitations are encoded by the sender and enforced on the receiver to ensure compliance and protection of the electronic files.

Turning now to FIG. 2 there is an embodiment illustrating 200 the steps taken by the file sender 202 of the electronic files 206 and the actions required at the accessing computer 214 to make use of the electronic files 206. There can be several embodiments for the preparation of the electronic files 206. In all embodiments a process, termed the programmatic interface (PI) 204 is used by the sender 202 to allow other computers to access the electronic files 206. While operating the PI the file sender 202 performs configuration decisions related to how the files 206 will be accessed and the types of authorization and authentication steps that are necessary to gain access to the access rules 234 and the files 206. These configuration decisions are collected into one file and it will be called access rules 234 in this application. Before these access rules 234 are exchanged with other computers they will be encrypted and in some cases combined with checksum values. Once configuration is complete and the file is encrypted these access rules 234 are ready to be exchanged with a file receiver or accessing computer 214. In one embodiment the encryption of the access rules 234 will be performed as part of the programmed steps within the PI 204. In another embodiment the encryption of the access rules 234 will be performed as part of the sending process by the File Sender 202 or by the Consolidation Site 216 before sending them to an accessing computer 214. By performing the encryption just before sending the access rules 234 to a file receiver 214 the file sender 202 is able to vary the values of the encryption keys for every different accessing computer 214. To decrypt the access rules 234 and the related files 206 a decryption component called the file access monitor 212 will also be needed. A full description of all the embodiments of the file access monitor 212 will be provided later in this figure.

In one embodiment the PI 204 is operated as a stand-alone interface. This embodiment is illustrated in subsequence figures. As a stand-alone interface the PI 204 provides its own user interface and runs as a discrete program. In another embodiment the PI 204 might be integrated into a larger software package, perhaps a computer aided design (CAD) software package or a medical documentation management package. In this embodiment the CAD designer or medical practitioner wants to share their file 206 and picks a menu option like: "securely share MyFile using access monitor" option. This menu item would then invoke the logic of the PI 204 to encode the configuration decisions into the access rules 234 and any related files 206 for delivery to a file access monitor 212 to enforce. The delivery is then made to another CAD program or medical documentation management package with the file access monitor 212 built in to enforce and make use of the access rules 234. There is also a subsequent figure to illustrate this embodiment.

The PI 204 and file access monitor 212 are designed with consistent functionality to ensure configuration selections offered by the file sender 202 can be enforced by the file access monitor 212 at the file accessor's 214 location. There can be several types of file access monitors 212 with different goals of operation and several different PIs 204 to match each of the unique file access monitors 212. In one embodiment there is one specific PI 204 matching a specific file access monitor 212 and in another embodiment there is multi-programmed PI 204 that allows the user to select the type of file access monitor 212 needed for a given circumstance. Different file access monitors 212 might focus on different technologies, for example one might focus on self-driving car file protection, one might focus on autonomous drone delivery file delivery information, one might focus on medical documentation protection, one might focus on video movie file protection, another one on music file protection, another one might focus on 3D printing operation and another on 3D CAD design behaviour to name a few.

Figure 3:
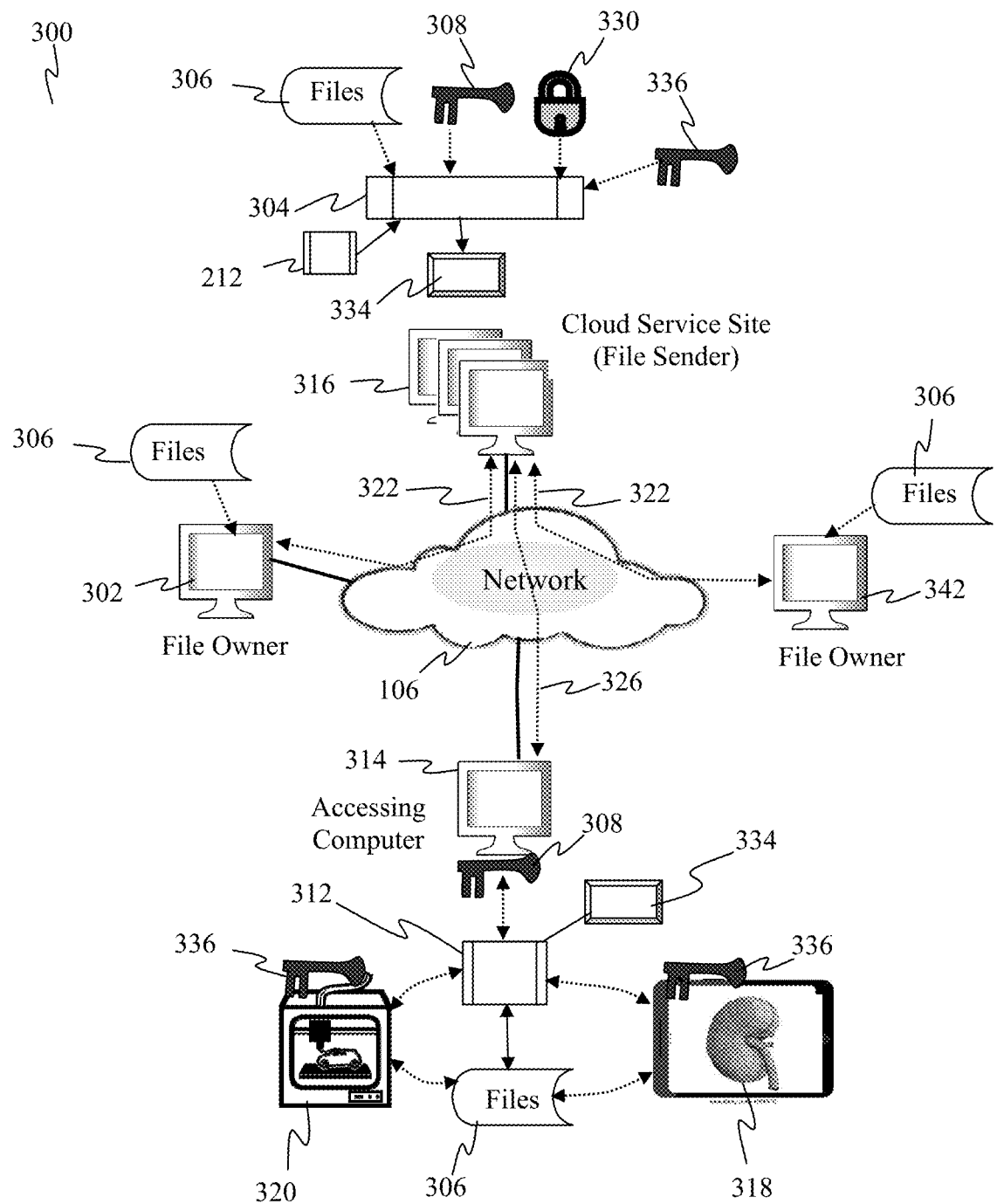
FIG. 3 is another embodiment illustrating the steps taken by the file sender of the electronic files and the actions required at the accessing computer to make use of the electronic files.

As the user works with the PI 204 they are given several options as to how to combine access rules 234, files 206 and the file access monitor 212. Any combination of these three components is possible as they will eventually come together if the user is to successfully access the necessary files 206. For example, in one embodiment the PI 204 consolidates the access rules 234 with the appropriate file access monitor 212 and the files 206 are not included. This might be valuable if the files 206 were provided in a face-to-face negotiation and were pre-encrypted for that purpose. In another embodiment both the access rules 234 and the files 206 are all combined with the file access monitor 212 to create a full combination of all three. In another embodiment the user decides to include the files 206 and the access rules 234 together and the file access monitor 212 is sent separately. This embodiment might be useful if the file sender expects that many different sets of files 206 could be delivered to the same file access monitor 212 again and again. For example if these files 206 are intended for a specific autonomous drone delivery service then it might receive many different delivery routes in a given day or week or month and the same file access monitor 212 can be used over and over. In another embodiment the file access monitor 212 is downloaded and installed and the step of inputting an authorization access key 230 causes the download of the files 206 and the access rules 234. How and when these components are encrypted will be discussed in detail in a later paragraph.

Where the file receiver 214 locates the files 206, access rules 234 and the file access monitor 212 can vary depending on the requirements of the system and how the file sender or file owner 202 sets up their distribution. In one embodiment the encrypted files 206 and encrypted access rules 234 may be sent 222 to a consolidation service site 216. In this embodiment the owner has protected the files 206 and access rules 234 before they are given to the consolidation site. In another embodiment the protection happens at the consolidation site 216 as illustrated in FIG. 3. In another embodiment the files 206 might be sent 224 directly to the file receiver 214 over the Internet, through a download from a corporate Internet web site, via electronic mail, via physical delivery of a storage medium, on a USB stick or through face-to-face negotiations to acquire licensing rights. In these direct delivery embodiments the files 206 are encrypted before being moved from the file sender's 202 system.

For the file owner 202 to deliver 222, 224 the files 206 there are several embodiments available. In one embodiment the files 206 are sent first but cannot be accessed without the download and installation of the file access monitor 212. In another embodiment the file access monitor 212 is downloaded and installed first and it locates and pulls down the encrypted files 206 as requested by the accessing computer system 214. In another embodiment the file access monitor 212 and files 206 are merged into one downloadable file 212 and are available at the same time and the access rules 234 is received separately. In another embodiment the accessing computer 214 gets one large collection of all three components and they self extract and are immediately available on their system 214.

As mentioned there are several different embodiments when using the file access monitors 212 within the system. In one embodiment the file access monitor 212 is programmed with low-level abilities to perform advanced operating system (O/S) monitoring. In this embodiment the need to use advanced low-level programming would result in a unique version of the file access monitor 212 for different computing or operating system environments. In these environments the O/S offers programmers the ability to sit alongside the O/S and monitor normal program operation. In other embodiments the file access monitor logic is built directly into the O/S. This might be very feasible with an open source O/S like a UNIX variant for example. With such abilities the file access monitor 212 could be developed to focus on computer aided design (CAD) programs and 3D printers. Such a file access monitor 212 would watch all file read and write requests and ensure the licensed file 206 was tracked through every file operation. Similarly the same file access monitor 212 could be watching all print commands, ensuring the 3D correct printer was being used and monitor the success or failure of the 3D print operation. In another embodiment the file access monitor 212 is built to monitor medical records that are based on a specific medical product offering. For example, a hospital management system might be used to generate the files and only other file accessors 214 that also use the system can open and access the file. Similarly if the system program attempts to print an x-ray file the file access monitor 212 might only allow a specific format of XRAY Printing solution to be used. In another embodiment the file access monitor 212 is built to receive encoded files 206 for an autonomous drone delivery service. In this embodiment the file access monitor 212 ensures the files are intended for this specific drone delivery system and that the files 206 are only read by the assigned program and are not hacked or corrupted by an outside program.

In another embodiment the file access monitor logic 212 is built into the core engine of a standalone software program. For example such standalone programs might include computer aided design (CAD) programs, 3D slicer programs, printer driver programs, medical documentation management programs, music players movie players, file manipulation software, and others. In this embodiment whenever one of these standalone programs has the file access monitor 212 logic built in, it will run continuously with the core program when it is loaded into memory and executed within an O/S. For the duration of the programs operation the file access monitor 212 logic provides access to any protected files 206 that the user operating these programs may wish to view, edit, manipulate or save. During the entire time a protected file 206 is open and being access the file access monitor 212 is running and monitoring all activity to ensure no illegal operations are attempted. For example if the user were to attempt to perform an export type function on a protected file 206 with the intent of creating an illegal duplicate of the file for another computer system the file access monitor 212 would block this operation. For other files that are not protected the file access monitor 212 logic is not invoked and monitoring is not preformed. In this embodiment the application sending the encoded files has a supporting web server in their protected environment, for example behind a firewall or within a Local Area Network (LAN) corporate environment, to support authentication of the file access key. In other embodiments the file access monitor logic 212 is embedded within a machine being used by the accessing computer system 214. It could be within a 3D printer, video display equipment, To prepare the files 206 for sending the file sender 202 runs a programmatic interface (PI) 204 on their computer system 202. Several versions of the user interface (UI) for this process is shown in subsequent figures. The goal of the PI 204 is to collect up the user's access goals for the program and encode them into a set of access rules 234. Through this interface the user identifies the one or more files 206 to be protected by the file access monitor 212. These files 206 may be related either to a specific design, part of a design, body part, movie file, music file or a specialized file program. For example the files 206 may all be part of one product that can be reproduced on one or more 3D printers. The files 206 could be both 3D design files, 3D render files and 3D GCODE files. In another example the files 206 could be all related to one person's medical history and contain, doctor's notes, MRI scans and digital x-ray results. Files within the medical record could also contain the design for a 3D blood vessel that can be printed for a specific patient. In some embodiments the files 206 may have been pre-encrypted by the user and the encryption key 230 is given to the PI to be included within the access rules 234. In this embodiment the user indicates there is a separate encryption key 230 for the files 206 and uploads this specific key using an interface provided by the PI 204. In this embodiment the system attribute used for authentication would be verified first before the encryption key for the file could be downloaded. In another embodiment the PI 204 allows a wildcard name to be used for the file name, like "DroneABC*.route". This would indicate that every file received with the initial string DroneABC ending with .route would be automatically detected by the file access monitor 212 and protected. In such a system a sequential number could be used like DroneABC<Date>.route or DroneABC<Route-Sequence-Number>.route or a combination DroneABC<Date> <Route-Sequence-Number>.route etc. could be used to feed sequential route commands to a delivery drone in a safe and secure way. In this example the <Date> value would be filled in each day and the <Route-Sequence-Number> would increase sequentially each day for each package to be delivered in the route. Of course it would also be possible that the delivery drone might return to the central office after each delivery and a new route would be uploaded and then protected by the file access monitor 212. The invention is flexible enough that in each file 206 could be protected using the same method and the file access monitor 212 could be programmed through the access rules 234 to watch for them and perform the requested actions based on the file sender's 202 original intentions.

The process of protecting the access rules 234 and files 206 is a key step with each embodiment that has been described. In broad terms the goal is to protect both the access rules 234 and the files 206 from any unlawful activities. Depending on how the owner of the access rules 234 and files 206 wants them protected they could have the same encryption or different encryption used. The methods to encrypt could be similar or very different. The steps to decrypt could be similar or very different. These different decisions become part of the configuration process and the functionality to support these different methods that can be built into the PI 204 and the file access monitor 212.

In some embodiments the PI 204 will pre-encrypt the access rules 234 and the files 206. In these embodiments the user might be asked to protect the access rules 234 by generating an encryption key. In other embodiments the user might be asked to provide a secret code or an Authorization Access Key (AAK) 208. The AAK 208 is a value that works directly with the access rules 234, while the system attribute value 236 works directly with the files 206. Depending on the importance of the file in some embodiments a longer AAK 208 might be used as the encryption and decryption key. In other embodiments a constantly changing random number might be used as the AAK 208. In other embodiments the AAK 208 might be used in conjunction with other data to decrypt the data. In other embodiments the AAK 208 is associated to a database record that holds the decryption key. In this type of embodiment the accessing computer 214 is able to establish a secure connection 224, 226 to the file sender 202, 216 in order to transfer the encryption key privately between computer systems.

In other embodiments an encryption key 208 is generated automatically by the file sender 202 at the moment the one or more file 206 has been requested by the accessing computer 214. This embodiment might have the encryption keys already established or they could be negotiated. Different methods of encryption will be discussed later in this figure. Encryption keys might be generated or harvested at the time of configuration or they could be generated later using a just-as-needed type of encryption strategy. In other embodiments the authorizing step to open the access rules 234 will guide a process of dynamically creating an encryption key for the files 206. For example the file access monitor 212 might be told by the access rules 234 to read the serial number of an attached machine or peripheral device and relay this back to the file sending computer 202 for verification purposes. This step could then be followed by using part of all of the serial number to encrypt the files 206 using a method shared only between the PI 204 and the file access monitor 212. In other embodiments the number sent back could be a dynamically changing random number, like one read from a secure token key. In those embodiments where an authorization access key is dynamically generated by the user a method like moving the computer mouse around the screen and randomly sampling the location of the mouse at different points in time allows the collection of random information and concatenating it together to create an encryption key. This method is quick and allows for a strong symmetrical encryption algorithm to be used to securing all information exchanged. These embodiments do require that a secure link 224, 226 can be created between computer systems.

The access rules 234 and files 206 will be kept in an encrypted format until the moment that access is requested by the accessing computer 214 site. When the access is complete on the access rules 234 and files 206, any decrypted portions are removed from Random Access Memory (RAM) where they may be been accessed during active use. If any copies are made to the files 206, or changes take place to the files 206 all derivative copies of the original are also encrypted to protect them. In other embodiments the files 206 might be given only in portions after full authorization and authentication has taken place. In this embodiment the one or more files 206 might be streamed to the accessing computer 214 after an earlier portion has been utilized. This method might be useful for movie files, music files, MRI files, X-Ray files, 3D printable files and other files destined to be acted upon by an attached machine at the accessing computer 214 site. In these cases the file access monitor 212 will continue to watch the destination system to ensure the correct program is printing or access the files 206 and that no illegal copying, hacking or damage is performed on the files 206. Streaming method also allows the file access monitor 212 to halt the stream of file 206 segments if something goes wrong. For example if a 3D file with a .GCODE type format is being streamed to a 3D printer but the 3D printer halts because it runs out of material to finish the printing process the file access monitor 212 can terminate the download stream and request no more segments of the file. In this way the file access monitor 212 acts as a stream monitor to determine when segments are sent, how much is sent and when to terminate the stream if necessary. In these embodiments storage is not an issue as the file 206 is used in segments and is never stored anywhere in its complete form on the accessing computer 214.

In another method the sending computer 202 or consolidation site 216 might create an encryption key using a key negotiation protocol like encrypted key exchange (EKE), Open key exchange (OKE), Simple Password Exponential Key Exchange (SPEKE) and newer advanced Diffie-Hellman methods like Supersingular Isogeny Diffie-Hellman (SIDH) or Learning with Errors (LWE) key exchanges. There are also the newer methods using Quantum-safe encryption methods. These methods would allow the creation of an encryption key 208 before the files are sent so they can be pre-encrypted with the newly negotiated key. As with all the methods described the resulting encryption key 208 is never saved into permanent memory by the file access monitor 212 at the accessing computer 214. For extremely sensitive files there are embodiments where the file 206 is encrypted differently every time a new access is requested for them. This embodiment might use a random number generator from a security token or from a mobile device to seed the encryption key each time the one or more files are needed. For example if the file access monitor 212 is stopped on the accessing system 214 all encrypted files are deleted. Then when the file access monitor 212 is restarted a new encryption key 208 is negotiated with a random number seed and file 206 are re-encrypted and re-delivered to the accessing system 214 once authentication is confirmed. This would lead to longer delays in accessing the files 206 which in some cases would limit which files 206 would use this procedure.

As the user builds up the access rules 234 they also indicate which program, printer name, printer type or access method is allowed on the file 206 to be monitored by the file access monitor 212. This field can be programmed in several ways to help guide the user with selection. In one embodiment if the file access monitor 212 was built and targeted at 3D design and printer files 206 then a drop-down list could be provided to the user 202 to guide their selection. For example if a 3D design file was included the user might be given a drop-down list that included: AutoCAD, SolidWorks, FreeCAD, TurboCAD to name a few. If the file access monitor 212 were programmed to know all about these programs, then it would present this choice to the user to pick one or more of them to limit which could be used. If the user 202 selected several of them then the file receiver 214 would be given a pick-list choice at their end and they would have to select the one they already owned, used and are familiar with. Once the file receiver 214 picked the file access monitor 212 would enforce that choice going forward with all file access on the one or more files 206 configured in this way. In other embodiments a similar pick-list mechanism could be used for 3D printers. For example it might be for a given 3D render file (.STL file) the user is given a selection of 3D slicers to allow access to the file 206. In 3D printing a 3D slicer is normally used to submit layer-by-layer the render file in .GCODE format to the 3D printer. Additionally the same file 206 might indicate both the 3D slicer and 3D printer to be used to best reproduce the product being printed. Using these guidelines and restrictions allows the file sender 202 to offer product warrantees on 3D printed items with a strong level of confidence that the 3D replication was successful. Similarly in another embodiment if the file 206 is a .GCODE file then a specific set of 3D printers might be provided in a pick-list to limit which 3D printers would be capable of reproducing the correct object. In another embodiment the user might be given a broad choice of OPEN as shown in greater detail in subsequent figures. A type of OPEN might allow any program to be selected for accessing the file 206. When this type of restriction is used the file 206 might be a very generic TEXT file and very informational only. For example one or more files 206 given the OPEN indication might simply list the patient's name, address and little else. In this embodiment encrypting the file once, delivering it safely to the file receiver 214 is sufficient security to ensure the privacy of information laws are met.

Once the user 202 has established all necessary settings and has completed creating the access rules 234 and identifying the files 206 they wish to protect the final step is to select the one or more qualifying steps to authorize and authenticate the use of the access rules 234 and files 206 by the file receiver 214. The number of embodiments in this area are countless and are only bounded by the functionality offered by the PI 204 and file access monitor 212. Protection will entail one or more steps including different operations like data exchanges, encryption steps, biometric verification, DNA comparison to name just a few options. In some embodiments when an authorization access key 208 is a string or visual value, it can be provided to the licensee (file receiver 214) using an out-of-band delivery method. For example it could be displayed on a computer screen over an Internet Secure Sockets Link (SSL) as part of a purchase transaction. It could have been sent over a Short Messaging Service (SMS) message to a cell phone. It could have come through a separate email message from any other messages used to exchange the files 206 or the file access monitor 212 or even through a person-to-person phone call. In other embodiments this value could even come in the post in writing or they could be included in a manual that accompanies a piece of equipment like a 3D printer. In those embodiments where an authorization access key 208 is a string or visual code, it is intended that the file receiver 214 will keep these values secret and to themselves. If this value is stolen it could lead to the possibility that the access rules 234 could also be stolen and could compromise the security of the files 206 depending on what method of authentication is configured. Naturally the thief will have to also have stolen the entire file access monitor 212 package, including the matching access rules 234, specific authentication values 236 for the one or more files 206 and possibly even a unique piece of hardware or computer system. In other embodiments the authorization and authentication will require specialized input for unlocking the access rules 234 and files 206. This could require an ever changing prime number or random number, a biometric input, a security code locked into a smartphone and shared only by Near Field Communication (NFC), a serial number or some other pre-existing value.

In other embodiments the authorization access key 208 or the system attribute 236 could be created by the file sender 202 by inputting a rotating security token or some other advanced constantly changing value like from a mobile device or cell phone. In this type of embodiment the user 202 might just make a selection in the PI 204 and a rotating security ID token value is inserted into the system. This value could then be sent via email, SMS messaging or given over the phone with a short duration lifespan of minutes or hours. An advanced PI 204 might be fully integrated with some advanced token generation system. These and other tokens and token software solutions are often integrated into software packages or embedded into devices like USB drives and cell phones for having easy access to the every changing security authentication code. In a similar embodiment a physical token device can be received by the accessing computer 214 and provided into the file access monitor 212 to receive and subsequently unlock the access rules 234. In this way the PI or server 204 verifies the value of the token with the server equivalent software that generates the same changing random number. In those embodiments where the authorization access key 208 or the system attribute 236 is biometric, for example a thumbprint, eye scan, breath sample, these solutions would be valuable when dealing with autonomous vehicles to be used by one specific individual. Without the individual present in the vehicle the file access manager 212 would not receive the correct system attribute 236 and would not unlock the route files 206 and the vehicle would not move.

In some embodiments the authorization access key 208 is the only value necessary to decrypt the access rules 234. This could be valuable when secure data communications cannot be guaranteed and when the files 206 value makes this a reasonable risk. In other embodiments that require server verification, a server that contains a database matching the authorization access key 208 and in some embodiments the system attribute 236, can be running and be reachable by the file access monitor 212. This server could be in the file sender's 202 computing environment or within a consolidation service site 216. There are many ways for the file access monitor 212 to know the address to this service and different methods will be discussed in subsequent figures.

Turning now to the file receiver 214 there are a series of step to access the one or more files 206 associated to a file access monitor 212. A simplified version of a potential user interface (UI) presented to the file receiver 214 are shown in subsequent figures. There are many possible embodiments to facilitate a file receiver's 214 use of the protected files 206. In one embodiment the file receiver 214 might have received 224 the access rules 234, the files 206 and file access monitor 212 directly from the file sender 202. In another embodiment these items might have been received 226 from a consolidation service site 216. In another embodiment these items might have been received on a portable storage device, mobile device or USB thumb drive. In some embodiments receiving one item, like the file access monitor 212 will facilitate the discovered and downloading of the other items. In other embodiments the logic of the file access monitor 212 is embedded into another software or hardware system and it facilitates retrieving and acting upon the files 206. For example a 3D printer with the file access monitor 212 logic built in might prompt the user on a small screen to enter an authorization access key 208. Once this is done it might use WFi to reach through a network 106 like the Internet to retrieve the access rules 234 and files 206. No matter how the items are received the first step is to run the file access monitor 212 logic on the accessing computer 214 that will be making use of the files 206. In some embodiments the accessing computer 214 is an attached peripheral, like a 3D printer or bio-reactor device. These distinctions in the makeup of the accessing computer 214 and any attached computers, networks, sub-networks, world-wide private corporate networks are not shown in this figure.

With the file access monitor 212 logic running there are several embodiments for retrieving, reading and executes the access rules 234. In some embodiments a UI could be provided that might be a standalone program that communicates directly with the running file access monitor 212. This embodiment might be useful if the machine running the file access monitor 212 has no physical screen and is looking at the UI over a connection like TCP/IP, Bluetooth, WiFi or NFC for example. In another embodiment the file access monitor 212 is serving up HTML over TCP/IP to allow the file receiver 214 to examine and review the access rules 234. The file access monitor 212 logic might be within an Internet browser extension so that may require a special installation step for the file accessing computer 214. In other embodiments the file access monitor 212 might look for a specific filename that it expects to be present on the accessing computer 214. This embodiment might be useful when the file access monitor 212 logic is running within a 3D printer and a specific printer configuration file is required to start the process of accessing the protected files 206. In other embodiments a peripheral type machine, like a 3D printer might have a security chip that provides a system attribute that then allows the file access monitor 212 to negotiate an encryption key. This negotiated key would then be used to encrypt the access rules 234. In this embodiment the user might start the process by entering the name of the file 206 they wish to access for some purpose through a User Interface (UI) provided by the file access monitor 212 logic.

As discussed in some embodiments when the authorization access key 208 or the system attribute value 236 is a security token or a biometric-based access key the exchange taken place via the physical delivery or receipt of the token device. In these embodiments once the current value of the security token or the biometric value is entered, the file access monitor 212 will need to open a communication path 224, 226 back to the source point where the file access monitor 212 can validate the key or value provided 208, 236. The source point could be the file sender's 202 web site, it could be the consolidation service site 216 or it could be another location. The file sender 202 might have included this source point in the access rules 234 or a user at the accessing computer 214 may have to manually enter it based on information provided when they licensed the files 206. The communication path 224, 226 to validate these keys 208, 236 will be over a secure connection to a web server. For example, a secure socket layer (SSL) connection or a secure VPN connection within a non-public environment will be used to help ensure these access keys 208, 236 do not fall into the wrong hands. In other embodiments either of these access key 208, 236 could used as a password secret to bootstrap the negotiation of an encryption key. That encryption key might then be used to facilitate all future communications over the Internet link.

Once authorization is achieved the file receiver 214 is now able to open and read the access rules 234. Once the access rules 234 are opened the file accessor 214 can review all the associated files 206 and the requirements attached to each file 206. The files 206 may be present or may be downloaded as required. In some embodiments the required files 206 use a streaming download method. This means only when the file 206 is required for printing or access will it be delivered to the file accessor 214 by streaming small portions of the file 206. The file sender 202 might have different restrictions on each file 206 depending on their type and target application. For example the file 206 might have to be printed on a specific plotter device 218. In another example the file 206 could be a 3D render file and can be 3D printed on a very specific type of 3D printer 220. The file access monitor 212 enforces the requirements based on what the file sender 202 originally encoded into the access rules 234.

To reach the point where the file receiver 214 can open and access the protected files 206 the qualifying steps of authentication can take place using a system attribute 236. There are many embodiments for this qualifying step that are possible and many different types of system attributes 236 that can be utilized. Many of these have been previously discussed for example a system attributes 236 can include the computer system value of the file receiver 214, it could be an attached peripherals 220, 218, held or worn devices that provide random numbers, biometric data and human DNA data to name a few. In many embodiment the type of system attribute 236 and how to use it are provided within the access rules 234. In those embodiments just as the accessing computer 214 attempts to use the protected files 206 the method for authentication is followed based on the access rules 234. The authentication in turn then leads to a decryption method that can be followed to decrypt and access the files 206. In some embodiments the system attribute 236 input is used directly to decrypt the files 206. For example this might be a biometric value or perhaps a portion of DNA genome data. In other embodiments the input from authorization is combined with the input from a system attribute 236 to form a more complex decryption value to decrypt the one or more files 206. In other cases the access rules 234 point to a source point to gather information to decrypt the files 206. For example it could be a random number from a token device, or a serial number from an attached computer system like a 3D printer 220, 218. In these embodiments the file receiver 214 would provide the serial number or some other value of the attached device or machine 220, 218 to encode the files. In some embodiments the file receiver 214 can run a browser extension or similar program to harvest a value from the file receiver 214 to authenticate it later when file 206 access was required. In this way an agreement is struck between the file sender 202 and the file receiver 214 to ensure the save, legal and authenticated use of the highly valued files 206. In these embodiments the qualifying steps of authorization are passed by providing the exact machine 220, 218, with the exact serial number needed to reach the decryption key to unlock the files 206 and provide access. For those files 206 configured with a just-in-time decryption method only when access is requested are they decrypted. In those embodiments where the files 206 are fully downloaded they are kept in an encrypted state within permanent memory. This method ensures they cannot be modified, reverse engineered or damaged through hacking. If a hacker attempts to change any file 206 while stored in an encrypted state and it will be rendered useless as it will fail when decryption is next attempted. For those files 206 configured for streaming, they are decrypted in portions and the decrypted portions are provided to the requesting program.

After the file receiver 214 has started access on one or more of the files 206 the file access monitor 212 runs in the background of the O/S to monitor, control and protect activity on the files 206. In some embodiments this monitoring takes place within a physical machine like a 3D printer 220 or Bio-reactor 218 that is growing a 3D model of a human body part. In those embodiments where the file access monitor 212 is running as an independent program, it is programmed using low-level application program interface (API) functions to control file activities, print activities, communication activities and other O/S functions. For example in an operating system (O/S) environment various system-level programs can rely upon service API libraries to build file system watcher programs. These services can integrate with task control, file access control, print control to produce a very extensive monitoring service profile. If a company builds the file access monitor logic into their O/S an even greater level of control would be possible. When embedded into a program, like a CAD program or a web browser the logic will necessary and operating to make use of any protected files. During the period when a file 206 is being access that is under the control of the file access monitor 212 it cannot be terminated from the system it is running in. At other times when the monitored files 206 are not being accessed the file access monitor 212 can be terminated and removed from the system. When the file access monitor 212 is not present and running the access rules 234, the UI and the files 206 themselves are inaccessible since they are all encrypted if saved in permanent storage.

As touched upon earlier the file access monitor 212 is programmed in specific ways and there could be different file access monitors 212 depending on the type of files 206 and the nature of the protection desired. In one embodiment the file access monitor 212 watches and monitors all file 206 activity related to the program that has been allowed to access a given protected file 206. In this case each file open, read, write, deleted to name a few example functions are monitored and either allowed, stopped or modified. In those embodiments where a secure link can be opened from the file access monitor 212 logic to the PI or server 202, 216 additional information and feedback can be provided. For example if a program opens a protected file 206 the file access monitor 212 can dynamically request the decryption key from the file sender 202, 216. It then, unlocks the file 206 provides the requested portion to the program and information about everything done to that file 206 is sent back to the file sender 202, 216 about all activity. If that same program then attempts to save a new, modified copy of that same file 206 it is intercepted, encrypted and stored on behalf of the program and information about the event is sent back to the file sender 202, 216.

In another embodiment the file access monitor 212 is designed to watch and monitor all print activities related to the files 206. In this embodiment if a file 206 is accessed and requested to be copied that procedure is monitored for success or failure. In the case of unique printing activities, like for example in the case of 3D additive manufacturing printing practices, the file access monitor 212 might also verify the type of print material in the 3D printer and the quantity remaining. In the case of printing x-rays for example the file access monitor 212 might confirm the type of printer being used and that the correct x-ray printing material is loaded into the printer and ready to go.

In other embodiments the file access monitor 212 might be programmed to understand navigation data and autonomous vehicle operation. Subsequent figures talk more about this type of file access monitor 212. In other embodiments the file access monitor 212 knows all about advanced DNA memory storage devices and is able to ensure correct and accurate usage and upload of data for such a storage medium. In other embodiments the file access monitor 212 understands dental records, dental implants and can ensure that reproduction of dental implants from supplied data is secure and successful and warrantee issues can be met through the verification process. In another embodiment the file access monitor 212 is programmed to know everything about autonomous drone delivery machines and the files 206 that can be sent, opened and read by them to determine delivery addresses and route information. In other embodiments the file access monitor 212 is embedded into a movie projector, 3D printer, Bio-reactor or some other type of peripheral computer and once authorization is complete the peripheral machine performs the necessary steps to authenticate the legal use of the files 206 and is able to unlock them.

Turning now to FIG. 3 there is another embodiment illustrating the steps taken by the file sender 316 of the electronic files and the actions required at accessing computer 314 to make use of the electronic files. In this illustration the file sender 316 is depicted as a cloud service on a network 106. The network could be a public wide area network like the Internet 106 or it could be a private VPN network within an international company. For example a world-wide airline might have a cloud service site 316 to allow any regional branch in the world to download a 3D design file 306 and print a necessary airplane part. In some embodiments the cloud service site 316 offers a web server that provides programmable interface (PI) 304 services to the file owner 302, 342. This type of cloud service site 316 provides a storefront for selling files 306 to the general public. As a current example with 3D design files an Internet web site like Thingiverse has over 1 million design files available for the public to review, download and use. The accessing computer 314 might have to communicate 326 to the cloud service site 316 to pay for and download the 3D design files 306. In this embodiment the file access monitor 312 might be a separate download and might then be used on all 3D files 306 received from the cloud service site 316. The main distinction between the cloud service 216 shown in FIG. 2 and the cloud service site 316 shown in FIG. 3 is how the files 306 are prepared or not prepared and given to the cloud service site 316. In FIG. 3 the cloud service site 316 is taking a greater liability risk by preparing the files, encrypting the files 306 and tracking their use on behalf of the file owners 302, 342.

To use a cloud service site 316 the file owner 302, 342 can upload (or otherwise make available) the files 306 to the cloud service site 316. In one embodiment the file owner 302, 342 decides to upload 322 the files 306 over a secure link to the cloud service site 316 where they are prepared and the associated access rules 334 are established. This could be over a communications link 322, through a public network 106 like the Internet using a SSL connection. Additional choices could be to use a WFi network, an Internet of Things (IoT) network or even a wide area wireless network like GSM, GPRS, Edge, 3G or 4G network. In some embodiments the files 306 could also be given to the operator of the cloud service site 316 via a physical media or by visiting a specific location and using Bluetooth, USB plugin or perhaps a NFC link. These more direct and physical methods would provide greater security if they weren't too inconvenient. Once the files 306 are present the PI 304 allows the file owner 302, 342 to customize how the files 306 are to be treated and access rules 334 are created. Different classes of files 306 would be configured in different ways. Subsequent figures provide several examples of different PI 304 operations. The user might be uploading 3D design and render files, video content, music content, software programs, static pictures or a range of other file types.

Once the files 306 are on the cloud service site 316 and access rules 334 are created there are several embodiments for supporting authorization and the related encryption services. In one embodiment an encryption key 308 is generated automatically by the cloud service site 316 at the moment the file 306 has been purchased by the accessing computer 314. In this embodiment this encryption key would then be associated to an authorization access key 308 when the user attempts to open the access rules 334. This method of encryption allows every purchaser of the files 306 to get a different encryption key 308 for authorization. In another embodiment a single encryption key 308 might be generated by the file owner 302, 342 through the PI 304 for the access rules 334 and every file purchase is associated to the same access rules 334. Using another embodiment the file owner 302, 342 might be asked to provide some random information, like movements of a mouse and this is combined with system information at the cloud service site 316 to further enhance the randomness of the encryption key and strengthen its value. There are many possible authorization methods possible including shipping security tokens, accepting bio-metric data, voice recognition techniques and advanced artificial intelligence methods to name a few.

As shown with the authorization step there are also several possible embodiments for authentication stage depending on the sophistication and complexity of the cloud service site 316. In one embodiment the file owner 302, 342 uploads a program that can be run to harvest a system attribute 336. In this embodiment this upload gives the file owner 302, 342 greater control over the system attribute 336 and can even change this method at any time should it become compromised. In another embodiment the cloud service site 316 dictates which system attribute 336 is required and can even vary this system attribute 336 between different purchases. The system attribute 336 might also be used directly or be used as a database reference for verification. In this embodiment one method for encryption would be to negotiate an encryption key after the system attribute 336 is verified. In other embodiments the cloud service site 316 could mail out a physical USB key or security token device for accessing the files 306. Many levels of sophistication and complexity could offered by the cloud service site 316 depending on the importance of the files 306 and how much cost the file owner 302, 342 was willing to bare.

When the accessing computer 314 acquires the rights to access the files 306 it proceeds in a similar manner as describe in FIG. 2. If the file access monitor 312 is not embedded in a connected peripheral 320, 318, in a larger software program or within the operating system (O/S) itself, then it can be installed and run on the access computer 314. In some embodiments the first step is entering the authorization access key 308 into the file access monitor 312 which must be verified over a communications link 326. One of the advantages of the cloud service site 316 for the file owners 302, 342 is this site 316 runs a sophisticated database and web server to match various access keys 308 and encryption keys for all file access monitors 212 to use. This can remove the burden of creating such a system at a corporation location with the subsequent work and management. If a secure link 326 cannot be established it is also possible that the authorization access key 308 will act as the decryption key to decrypt the access rules 334.

After the authorization access key 308 is provided the file access monitor 312 has several embodiments as to how to proceed. In some embodiments the file access monitor 312 is programmed to use this key 308 as the decryption key. In other embodiments the key 308 is sent over a secure link 326 where it is verified by the cloud service site 316 and the encryption key is provided. The goal of both methods is to decrypt the access rules 334 so they can be examined and acted upon. The file access monitor 312 can then proceed to the qualifying steps of authentication which will unlock the files 306. As already discussed in FIG. 2 in other embodiments the access rules 334 direct the file access monitor 312 how to perform the qualifying steps of authentication. Once authentication is achieved the file access monitor 212 allows file 306 access and interfaces to 3D printers 320, X-Ray Plotters 318, software programs, web browser applications and other elements on the accessing computer's 314 system.

Figure 4:
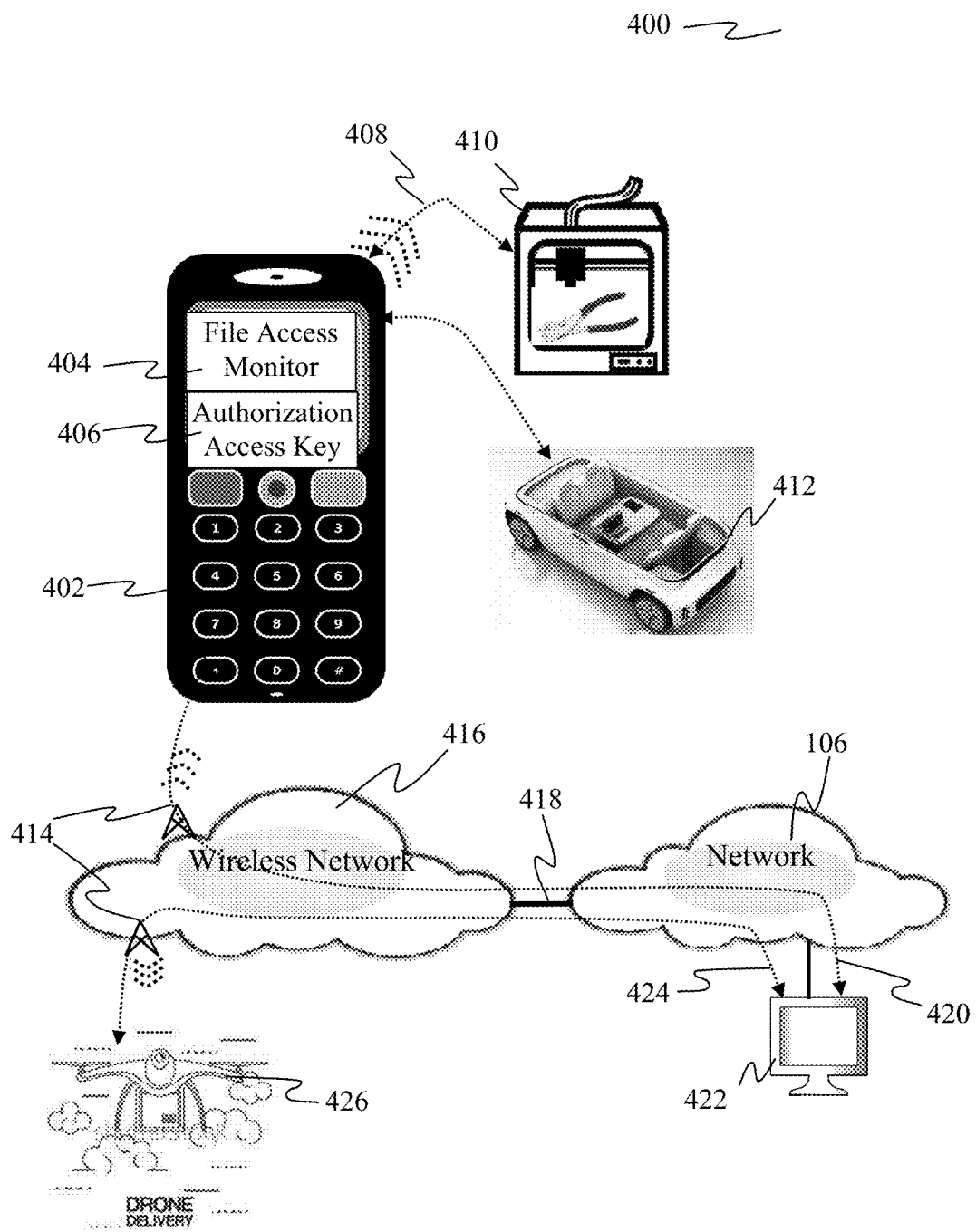
FIG. 4 is an embodiment using the invention in a mobile radio frequency environment.

Turning now to FIG. 4 there is an exemplary embodiment using the invention in a mobile radio frequency (RF) environment 400. In the first example the file access monitor 404 is running on a portable mobile device 402. This mobile device 402 could be a cell phone, smart phone, PDA, mobile tablet device, laptop or some other form of portable, movable computer. In some cases the mobile device is using a wide-area radio frequency (RF) type frequency like GSM, GPRS, LTE, 4G or 5G networks 416 offered to the public. The mobile device 402 could be using public or private WiFi network 416 following the 802.11 standard. The mobile device 402 could be custom built for the purpose of offering communication to older machines 410 and devices 412 that do not have data communication options built in. It might couple to the old device using a proprietary cabling system, USB or utilize some other coupling method.

In this embodiment the file sender or licensor 422 might be sitting on a wired network 106. They could also be located on the wireless network 416 offering files for license. In many embodiments the file sender 422 uses the wireless communication path 420 with a file accessor 402 for the purposes of utilizing a secured file and the related access rules using the file access monitor 404. In other embodiments all the necessary files and security keys are located on the mobile device to utilize the protected files. In other embodiments the mobile device already has a file access monitor 404 and download the access rules and files. In those embodiments where the authorization access key 406 is verified it uses a secure communication path, for example one using SSL protocols, will also be required so that the file access monitor 404 can communicate to the file sender 422 to verify the authorization access key 406 and receive decryption keys to access the secured files. Connections between wireless 416 and wired networks 106 like the Internet are available using network address translators (NATs) across commonly shared connections 418 is an example method for achieving such diverse network connections. It is possible the mobile device 402 received the file access monitor 404 and any related files it is protecting via a physical medium like a USB thumb drive or mini SD drives or other storage media. The mobile device 402 might have also downloaded the file access monitor 404 separately from an application store (app store) from sites like the ones offered by Apple or Google for mobile applications. In other embodiments the file access monitor 404 might be running as a web browser extension within a program running on the mobile device 402.

There are many embodiments for the mobile device 402 to acquire the secure files and the matching access rules they wish to access. The mobile device 402 might be using a web browser to purchase secure files and their related access rules via an Internet web site that will later be provided to file access monitor 404. The mobile user might have used different means to acquire the secure files if they are large, perhaps over a fast and cheaper WiFi network. Once the larger secure files are received the access rules could be downloaded using another method like Edge or 4G protocols. The files and access rules could also come bundled together with the file access monitor 404 on a USB key, mini-SD drive or some other portable media. In another embodiment they could have been received from another user or terminal using Bluetooth or NFC communications.

The user on the mobile device 402 acquires the authorization access key 406 and inputs this value into the file access monitor 404. There are different ways the mobile device 402 can receive this value. In an embodiment the authorization access key 406 might have come over SMS to the mobile device 402. SMS is different enough from electronic mail that it makes intercepting this type of message more difficult. In another embodiment it might have come through an encrypted electronic mail (email). In another embodiment it might have come as a hyper link within an email and the user can follow the link to a secure web site where the authorization access key 406 is displayed. In another embodiment the authorization access key 406 is provided via a phone call and read out by an automated computer. In another embodiment it was physically copied down after being displayed on the same Internet web site where the user purchased rights to have the files. In one embodiment the step of inputting the file access key 406 might trigger the file access monitor 404 to download the files and the related access rules for those files. In another embodiment the file access key 406 has been provided at the same time the files were licensed. In another embodiment the mobile device might be using software from a company like RSA that provides a constantly changing random number that matches a similar random number on the file sender's computer 422. These are just a few of the different embodiments for exchanging the authorization access key 406 with the mobile device 402.

In some embodiments the mobile device 402 might be the intended target for utilizing the secure files. For example it might be for watching a licensed movie or listening to music files. In other embodiments the mobile device 402 is acting like a proxy for one or more peripheral devices 410, 412 that might want to utilize the protected files. In this embodiment the file access monitor 404 is communicating 408 to a 3D printer 410 for the purposes of reproducing a physical 3D object. The communication 408 might be over an RF frequency or it could be a physical connection, like a USB link or a Bluetooth link for example. As already discussed the file access monitor 404 provides an interface to the user and allows them to select one or more files to access. If the mobile device 402 is powerful enough it might even run CAD software and the user might be able to perform some minor changes to the design before 3D printing 410 it. If the mobile device 402 is connected to the destination to use the file then the access rules will indicate what steps are necessary to pass the qualifying steps of authentication. As discussed in detail in FIG. 2 this might involve allowing harvesting of hidden system information within the mobile device, like a serial number, a Subscriber Identity Module (SIM) card value, an international mobile subscriber identify (IMSI) or many other possible values. It could involve providing biometric scans, like a finger print or voice print information. Once authentication is achieved file access can take place as requested as facilitated by the file access monitor 404. It performs the decryption steps to access the necessary files and monitors the activity to ensure it conforms to the licensor's 422 desires.

In another embodiment the file access monitor 404 watches and monitors all navigation data being uploaded to vehicles 412. The vehicles 412 could be normal person-driven machines or a self-driving autonomous vehicle 412 that require extreme care when accepting and loading navigation data. In this case the file access monitor 404 might be programmed to ensure the correct vehicle 412 has received the data and that the vehicle navigation controller is ready to receive the data. Authentication is used to harvest information from the autonomous vehicle 412 for encryption of the files to be used for navigation. In some embodiments the use of just-in-time encryption might be very valuable to ensure that outside hackers do not damage the original data and perhaps create a traffic accident, create traffic chaos, steal delivery packages or cause damage to the delivery system. If the data communication link is broken during the transmission of the encryption key or encrypted navigation files or for some other reason is unavailable the autonomous vehicle 412 would have to pull off the road, stop and wait for the communications link to be restored. It is also possible that such an advanced self-driving vehicle 412 has build-in RF capabilities and does not need to use an external mobile device 402. In this embodiment the vehicle 412 communicates directly to the file sender 422 and exchanges any necessary files and file access monitor information. As already discussed in this case the file access monitor within the vehicle (not shown) might be programmed to monitor all types of files that match a certain naming convention using a wildcard filename method. This allows the file access monitor not to be reloaded every time a new group of files are downloaded. In this embodiment there is no need to revisit the file access monitor's UI every time a new file is received and loaded as the file access monitor is programmed to watch for all files of a particular type and use the same access rules for each of them. For example the files might all have the format: <date>0.00x where date is today's date and x is a sequential number that orders the files in a given day. In this way the access rules simply need to be established once every morning and the autonomous delivery drone runs and processes the dated and numbered files throughout that day. Using a newer device like an autonomous vehicle 412 might also offer many additional methods for performing the qualifying steps of authentication. In some embodiments the owner of the autonomous vehicle might have to enter a security token value or insert a special hardware device into the USB connector on their mobile phone. In another embodiment a breath sample, fingerprint or some other biometric value might be important and also verify the inebriated state of the occupant to ensure they do not attempt to take over control and drive the vehicle 412.

In the second embodiment shown a fleet of drone delivery vehicles 426 communicate 424 to the file sender 422 through a wireless radio frequency network 424 through various access points 414. Direct communication 424 means the drone vehicles 426 have built-in WFi, IoT or wide area wireless connections like GSM, GPRS, EDGE, 3D, 4G and 5G type technologies. These drone devices 426 might even have a combination of RF capabilities in case they move out of range of one connection they can fall back on a wider-coverage and perhaps slower connection. Once loaded with the access rules the UI for the file access monitor within the drone (not shown) might be done through a TCP/IP link via a web browser interface over HTTP. In this embodiment the UI is offered by the file access monitor but instead of O/S based screen commands it is using HTML over TCP/IP to present the access rules and the options. Once accepted the file access monitor runs indefinitely reading, protecting and providing access to sequential files that tell the autonomous delivery drone 426 where to go and what to deliver. In some embodiments the operator enters the authorization access key at the start of the day to open the access rules and authentication is achieved through a pre-coded vehicle system code held within the computer systems of the autonomous delivery drone 426 itself. In other embodiments the operator enters the authorization access key and the file access monitor running in the drone reads the serial number of the current autonomous drone 426 that is being used that day. In this embodiment only if the route commands have been received by the correct drone will it be able to decrypt the files and deliver the packages. For a very large company like Amazon for example, this would help to ensure the drone in question is in the right city and country for the delivery.

Figure 5:
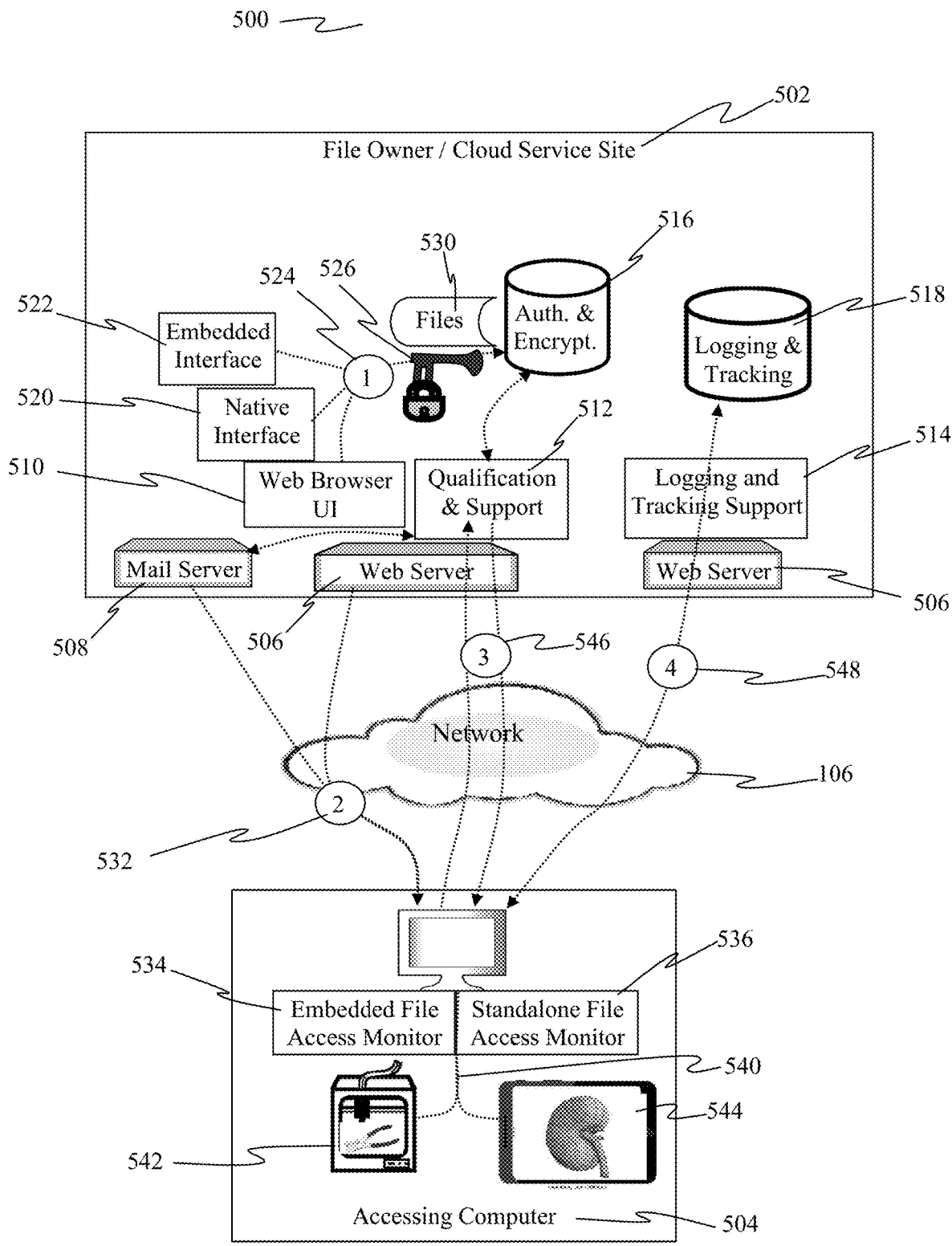
FIG. 5 is an illustration of an embodiment for implementing the secure exchange and access of protected computer files.

Turning now to FIG. 5 there is an illustration 500 of an embodiment for implementing the secure exchange and access of protected computer files. Although there could be a myriad of different embodiments this figure shows one exemplary embodiment and discusses different partial embodiments for different elements of the design. The main focus of the design is on the file owner or cloud service site 502 and its interaction with the accessing computer 504. In this embodiment it is assumed the file owner 502 and the accessing computer 504 are capable of opening a secure connection between them. In other embodiments discussed earlier there are circumstances where such a connection is not possible so all qualifying steps can be performed locally and encryption done using known local values. The file owner 502 may be the licensor or owner of the files to be protected. If a cloud service site 502 is used, an owner of the files performs several additional steps that will be discussed within this figure. From a system architecture point of view the site has one or more web servers 506 and potentially one or more mail servers 508 running in support the necessary functionality. The solution may also be well suited to run in an environment where computer resources are rented, for example the Amazon Web Services (AWS), GoDaddy Web Services and hundreds of others.

Web servers 506 are offering services to support the functionality of protecting computer files. There is a Web Browser UI module 510, a qualification support module 512 and a logging and tracking support module 514. These components could run within the same server or be spread across many servers to load balance the CPU requirements of the system. In this embodiment the qualification support module 512 handles the one or more qualification steps of authorization and authentication. In turn these modules interface into different database systems 516, 518. The authorization, authentication and encryption database 516 (Auth. & Encrypt.) supports associating files 530 to various types of authorization access keys 526 and system attributes 526. Additionally if encryption keys 526 are created during the configuration process or if any encryption key 526 are uploaded during the configuration process they are also associated to the files 530 and are stored. The logging and tracking database 518 supports the accumulation of logging and tracking data and the ability to organize and report on all activities to file owners and regulators.

The process starts with step 1 524 when a user decides they wish to protect one or more computer files 530. The files 530 could be uploaded, as in the embodiment where a cloud service site is used. The files 530 might also be local on the computer system or private computer LAN, as in the embodiment where a corporation is using the invention. In other embodiments the files 530 might already be resident on the accessing computer 504 and were provided via other means like one or many portable storage media. In this embodiment the user will need to have the encryption keys used for those files 530 so the file access monitor 534, 536 can provide eventual access to them. To proceed with step 1 524 there are three embodiments shown but more are possible. In the first embodiment a Web Browser UI 510 is used to allow the user to select access rules for the files 530 to be protected. Using a web browser or a program that understands and can process HTML commands the user performs configuration steps. In some embodiments this will result in an access rule file being built and placed into the Auth. & Encrypt database 516. In some embodiments this access rule file will be immediately encrypted before it is saved. In other embodiments the access rule file is saved and only encrypted when access to the files 530 is requested. In other embodiments the configuration settings are saved and associated to the files 530. Only when an accessing computer 504 requests the files 530 will the qualification support 512 build and encrypt an access rule file. In the second embodiment a Native Interface 520 is used that relies upon O/S interface calls and O/S API calls to present the choices for the user. Once the user has made all the necessary choices for protecting the files 530 the files and resulting access rules or configuration settings are stored in the Auth. & Encrypt database 516. In the third embodiment an embedded interface 522 is provided that works in conjunction with another program. As discussed this other program could be a CAD program, a word processing program, graphical manipulation or photo editing software program or many other programs that manipulate files. Once the user makes the request to share one or more files 530 and completes the protection choices the requested files 530 and resulting access rules or configuration settings are stored in the Auth & Encrypt database 516.

In some embodiments any of the three user interface choices might also take either an authorization access key 526, a system attribute value 526 or an encryption key 526 from the user and insert that into the Auth. & Encrypt database 516. In some embodiments the Qualification Support module 512 will automatically generate an authorization access key when a purchase takes place for one or more protected files 530. Similarly when using just-in-time encryption one or more encryption keys may be dynamically created or negotiated when they are needed at the time an access computer 504 desires to use the files 530 once authentication has been verified. The decision to generate an authorization access key might be built upon the question of whether the user wants to immediately send either of these access keys to a specific access computer 504. For example if a user is in conversation with a colleague and they agree a file is needed to complete some kind of work project the decision could be made to send an authorization access key immediate to them via email or read them over the phone. In this embodiment the accessing computer 504 might provide verbally a system attribute for the file owner 502 to encode into the database. In another example a hospital research facility might have a design for a liver that can be 3D printed and a hospital calls the facility asking for an urgent delivery of the 3D print file so they can print a liver for an ailing patient.

In this embodiment once the files 530, access rules or configuration settings are saved in the Auth. & Encrypt database 516 the next step 532 can take place. In the embodiment where a cloud service site is used the user might then complete their sales web page that describes the nature of the file 530 being offered for sale. It could be a video file, a 3D prosthetic limb, or a 3D printable pair of shoes or many other similar items of value. Once the sales web page is complete the Qualification & Support module 512 would associate that sales web page to the access rules and files 530. When an interesting party browsing the storefront comes across the web page they can decide to purchase based on the description provided by the owner of the files 530. In another embodiment with a corporation for example the user protecting the files 530 might request a link from the Qualification & Support module 512 to send to the accessing computer 504. In another embodiment the user provides one or more email addresses and the Qualification & Support module 512 sends an email to one or more accessing computers 504 informing them about the availability of a new file for acquisition. It could be for sale, it could be for their secure pickup, it might be something they are waiting for or many other reasons. This extra level of security would require the person receiving the email to confirm it is them by following a link to a destination page and perhaps answer a few questions before getting the authorization access key in step 3 546. They might also have to download the file access monitor 534, 536 before they can begin accessing the files 530.

Step 2 532 is the delivery of the authorization access key 526 to the access computer 504. As discussed earlier there are many embodiments to allow this to happen. The delivery of the authorization access key should be done in as secure a method as possible. In one embodiment it is sent via a special email or secure email method. In another embodiment the user is given an email and re-connects via a web browser and answer one or two questions to confirm who they are—this approach was just discussed. If they pass this challenge the Qualification & Support module 512 would generate a new authorization access key, associate the new key to the access rules and perhaps the files 530 and present this value to the accessing computer 504. In one embodiment the authorization access key 526 would be displayed on the screen for them to write down or copy and paste into the file access monitor 534, 536. In another embodiment an SMS message could be used to send the value more securely to a mobile device.

Now with the authorization access key 526 the accessing computer 504 can run the file access monitor 534, 536. There are two example embodiments of the file access monitor shown 534, 536 but others are also possible. There could be an embedded file access monitor 534 running within a larger application like a CAD program, a word processor or even as web browser extension. There are embodiments where the file access monitor 534 is running within another peripheral device 542, 544 within the accessing computer's 504 environment. Such devices could be a 3D printer 542, a Bio-reactor 3D printer 544, within a movie projector or many possible physical machines. When running the embedded file access monitor 534 the user will be prompted for their authorization access key 526. In another embodiment the file access monitor 544 is running as a standalone program and also prompts the user for their authorization access key.

In those embodiments where the authorization access key 526 does not act as the encryption key for the access rules the process of verifying the authorization access key takes place in step 3 546. In step 3 546 the file access monitor 534, 536 sends the authorization access key 526 over a secure link to the Qualification & Support module 512 for authorization. Naturally this authorization access key 526 could also be a security token, it could be biometric value like a fingerprint or many other values. If the authorization access key 526 passes verification the Qualification & Support module 512 matches it to the access rules and files 530. There are several embodiments possible for the Qualification & Support module 512 at this point in the process. In one embodiment the Qualification & Support module 512 then generates an encryption key and saves this in the corresponding database record for the access rules and files 530. It then uses this newly generated encryption key to encrypt the access rules before sending them to the file access monitor 534, 536. In another embodiment an encryption key for the access rules already exists and it is provided. It then delivers 546 the encryption key, an encrypted copy of the access rules to the accessing computer 504. Depending on the embodiment it is possible that an encrypted copy of the files 530 are also sent to the access computer 504. With the encryption key for authorization and the encrypted access rules in hand the accessing computer 504 can open and read the access rules. Even at this early stage information can begin to flow to the Logging and Tracking Support module 514. In one embodiment this tracking of activity could be done using a web server either through a proprietary protocol or piggy-backed over an HTTP protocol to make it easy when dealing with firewalls and configuration changes.

Based on the information within the access rules the accessing computer 504 might follow several different steps to gain final authentication to access the files 530. Authentication proceeds based on the saved information by the file owner 502. In other embodiment this information might have been harvested from the accessing computer 504 at the time of purchase for example. In another embodiment it might have been verbally provided in a collaborative arrangement between parties that know each other. In another embodiment a special randomly changing number or serial number is read from an attached peripheral 542, 544. In other embodiments a security token is required and a number must be entered. Once authentication is passed the user can open and access the files as indicated by the access rules.

In other embodiments, not illustrated here, the Web Browser UI 508 is running on a cloud service site 502 and allows the user upload the access rules in a completed state. In this embodiment the user would not build the access rules on the cloud service site but at their own site in a more private manner at their own convenience. Once completed the access rules would be uploaded with the files 530 and inserted into the cloud service site's database already completed. The access rules and files 530 could be even pre-encrypted before uploading for greater security.

In another embodiment the encrypted access rules or the encrypted files 530 or a combination of the two are uploaded to a cloud service site for sale. After the accessing computer 504 purchases the rights to access the files 530 and pass authorization, they can download the access rules and are given an authorization access key to open and read the access rules. After this stage the purchaser operating on the accessing computer 504 are directed back to the owner's computer system to pass a different authentication stage where they can retrieve the files 530 and associated encryption key to unlock and access these files 530. This embodiment and other embodiments are possible as the invention allows for many flexible and varied implementations.

Turning now to FIG. 6 there is an illustration of a first embodiment showing a programmatic interface 600 that would be used by the file sender to prepare access rules for delivery to an accessing computer. Although the UI 600 shown is detailed it is just one possible representation and has been tailored to an illustration format for this application. For example the menu items for taking action 604 do not show a sub-category of selection. In advanced UI development and web browser interface sub-menus, pull-down menus, hover effects and other events are commonly used. Through this section some sub-actions will be described where different embodiments could be considered. The number and permutations of screen layouts can be infinite and varied depending on the computer system be used, the O/S being used, whether it is a specific program or being run within an Internet web browser as a series of HTML commands, or as a stand-alone computer program. Showing mouse movements, hover effects, right mouse clicks, left mouse clicks and advanced UI operation is all presumed possible but not easily shown in a two dimensional illustration. The title provided is Acme-Research.com Secure File Services 602, to represent a company, either private or perhaps a cloud service offering for medical information and patient records. Any title could appear here but this is descriptive of the action to be taken by the programmatic interface (PI) to generate and output a rules file and to create security parameters for authorization and authentication for eventual use by a file access monitor. This example of an Acme-Research web site will be followed by several other examples of different implementation of a rules generator interface.

This example of a programmatic interface (PI) presents some menu choices 604 to allow for several menu choices like start a 'New' rules file, 'Open' an existing rules file, 'Save' the current rules file, 'Save As' to rename the current rules files, 'Print' the current rules file, 'Send' a rules files and 'List All' existing rule files. These are just a few choices and other choices could exist like delete a rules file, rename a rules file and others. When a Save or Save As command is issues a rules file is automatically generated and saved to a database maintained by this web site. As mentioned earlier this action might save an actual file or it could save the parameters only and build a file only when an accessing computer requests one or more of the protected files. A send command might be present and be followed by a prompt to accept an electronic mail (email) address of the receiving party. Whether a Save, Save As or Send command is requested all these actions require the user to have completed the entire form shown to them. If there is an error on the form the area would turn red and the user would have to complete that section before they could continue.

The first two sections, labelled Monitor File Section 604 and Monitor File Actions 616 are intended to separate those values and inputs meant to be included in the access rules file. The Security Section 620 and the Generate Actions 632 section help guide the access rules generation, authorization steps and authentication steps. One of the first steps in this embodiment is for the user to associate the files 606 to this instance of access rules and give them attributes for usage 606. These are the files 606 that will be immediately associated to the access rules being generated. In this embodiment for each file listed 606 the user is given a chance to detail the target restrictions 608, 610, 612, 614 for that file. The title 606 for this section sets a set of guidelines for the associated files, the set of guidelines and restrictions shown are 'Access' type, 'Program' to access, 'Security' type, 'Method' for that type of security and 'Done' or complete. This is one embodiment and in other embodiments other restrictions could be included for example Printer name or type or even the type of Printer material that must be present could all be target restrictions.

The monitor file section 604 lays out both how the file access monitor should use and protect each file. In this embodiment a set of patient records are shown for PatientZ, ranging from basic information, medical history, xray files, MRI files and a 3D liver scan for bioreactor usage. In this embodiment to show the flexibility of the system most of the files have a different type of access allowed, a different program that can open or access the file, a different security and a different security and delivery method. File 1 is the PatientZ_Info.txt file and allows only read access on this file. It can be used by any program that understands this file type, it will use the Computer Name for authentication and encryption and it can be delivered to the accessing computer at any time. This file might be considered only modestly important as it has little more than the person's name, address, age and physical characteristics. File 2 is the PatentZ_Hist.soft file and it allows reading and adding to possibly extend the file with addition tests and medical history. In this embodiment the restriction might prevent the creation of a copy of this file with changes made to it. Having multiple history files for one patient might get confusion. In this example the .soft extension on the file indicates that a program for hospital management software was used to create it and so only the hospital management software can be used to open and view this file. Finally the file also uses the Computer Name 610 of the accessing computer for authentication and encryption and the file can be delivered at any time. File number 3 is PatientZ_xray.ayc file and it allows read and print only for this file. The program to access this will be an specific type or brand of X-Ray Printer only having serial number 1 610, for example. This serial number must be provided by the accessing computer site for this X-Ray printing machine and this serial number is also used to encrypt the file 610. This indicates a more serious level of protection for this file as it might be considered more sensitive and worthy of greater protection. The method of encryption is proprietary between the PI and file access monitor and many different types could be provided. In this embodiment the code used is 128-A4 612 which could mean almost anything. For example it could mean that the serial number is extended to 128 bits and A4 indicates that only odd number characters are taken to make up the 128 bits and that an RC4 encryption. In other embodiments the A4 might mean to take only the first 4 characters of the serial number and extend that to 128 bits. Many other means could be assigned to 128-A4. This file can also be delivered at any time 612. File number 4 is PatientZ_mri.mri file and it can be read and printed as with the xray file. This file must be used only by an MRI Scan Viewer device and to unlock the file a security token device number 2 614 can be required. This security token device can be delivered to the accessing computer site before this file can be decrypted. To enable the use of the security token the delivery method is set to 'just-in-time' 614, meaning that only when the file is about to be accessed will it be encrypted with the corresponding security token random number value. Finally file number 5 is PatientZ_Liver .bio file for read and print to a bioreactor. A bioreactor might act similar to a 3D printer and lay down layer upon layer of genetic material, like human stem cells upon a substructure of either organic or inorganic material. In this embodiment file 5 has a very high level of security and a partial DNA sequence has been used to encrypt the file for authentication 614. The method used is for coming up with this DNA sequence is genotyping method G3 614, which could mean a wide range of pre-configured methods that is established between the PI and the file access monitor. For example a genotyping method used could be restriction fragment length polymorphism, polymorphism polymerase chain reaction or one of many other known or future discovered methods. This file has a just-in-time delivery method to the accessing computer 614.

With the files defined and restrictions in place some additional file access monitor actions can be provided 616. There are many possible ways to control the file access monitor or file access monitor logic depending on the nature of the files and their intended usage. Video files will have different restrictions then medical files and different again would be autonomous vehicle or autonomous drone delivery files. In this embodiment three examples are provided 618. The first allows the user to select whether a constant secure connection is required for the file access monitor to operate 618. In some embodiments the file access monitor is providing constant feedback, status changes and file usage information for tracking and logging requirements. Setting this to 'Y' es might create problems for the accessing computer, but help immensely in those situations where trust might not be high for the accessing computer. For example if an accessing computer is attempting to break different encryption values over and over again this might be easily detectable at the server and the file access monitor could be sent a command to erase the files immediately. The second parameter is provided to indicate where the server is located 618. In this embodiment "www.acmeresearch.com" is the destination Internet web address used to establish communication with the server. Even if a constant connection is not required the file access monitor will have to establish a link to exchange security information for authentication and possible for authorization depending on the next parameter setting. The third example of a file monitor action is how to encrypt the access rules 620. If the authorization access key can be used then the access rules are simply encrypted using this value, perhaps extending a string to 128 or 256 bits. There are several embodiments to indicate this method to the file access monitor. One embodiment would have the file access monitor always attempt to decrypt the access rules with the authorization access key and see if an understandable result takes place. Another method could be to place a special indicator at the front of the file that could never occur naturally. The second choice shown is to retrieve an encryption key 620. In this embodiment the user will get a strong security for the access rules but they also have to generate their own encryption key 632. This generation step is described later on in this section.

The next section is the security section 630 and it helps to collect key information to protect the access rules and the files. Since there can be many qualifying steps of authorization and authentication this section can have many different embodiments. This information is not sent to the accessing computer but is either used directly for encryption purposes or is saved in a database related to these access rules. For example not shown in this embodiments might be the step of uploading a file with biometric information. There could be an embodiment that takes USB or Bluetooth security information from a smart phone or mobile device. Perhaps a mobile wallet is used to exchange secure information and security codes. In this example embodiment the menu items shown 630 include generating a Key, adding a Serial number, inputting a security token and uploading an encryption Key. This represents just one embodiment of choices and does not show drop down menus, sub-menus and other advanced methods of providing even more menu choices. There could be menu options for entering mobile identification values, biometric values or entering codes for a variety of security methods.

One of the first steps in this embodiment is to enter an authorization access key 634. This key may be used in two ways in this embodiment as illustrated by a later selection as to which method to use to protect the access rules 630. The authorization access key 634 could be used to encrypt the access rules directly 630 to allow for situations where a secure communications link is not available. In some embodiments the PI might require a longer or more complex input string by the file owner. The alternative choice shown in this embodiment 630 is to use the generated key 632. In this embodiment the generated key 632 would be created by moving the mouse around the screen and collecting random information from location data and then concatenating this together to create a 128, 256, 512 or larger encryption key. In this case the authorization access key 632 would be used to verify the validity of the accessing computer and would send over a secure connection to retrieve the larger generated key 632. This same generated key 632 will be used by the PI to encrypt the access rules before they are sent to any accessing computer.

Additional security values might be needed by this section depending on what protection methods have been requested in the files section 606. The first menu item to be answered is how to retrieve the system attribute information 636. This indicates whether a program can be used to harvest the information or whether the different fields must be manual input by the user 636. If the information can be harvested it can be omitted from this process and it must be provided by a person on the accessing computer before they are able to open and access any of the protected files. If they are manually entered the first step shown is for the user to input the serial number 1 for those files indicating serial number 1 be used for authentication and encryption on one or more files 610. So in this section 630 the user will input the serial number value 638 so it can be used on those files that need serial number security protection. There could be one or more serial numbers needed to be input depending on how many peripheral devices are involved with the one or more files. In another example one of the files is protected using a security token, shown as, for example, RSA-Token2 614. This is effectively a random number that changes every 'N' minutes to a new unpredictable number. Using this type of encryption method means the encryption step can only occur the moment the file is needed for access and the accessing computer will have only 'N' minutes to decrypt the file before the number changes and it must be re-requested. In this embodiment the security token can be identified 640 so the correct number is used. A company can provide a server-based security token tracking system with an API that can be used to retrieve a current random number for a given handheld security token. This two are in sequence and can be used to encrypt anything, like a file. The number might be extended to 128, 256 or a higher number of bits to create a strong security encryption value. Finally in this section 630 a computer name might be needed for any files 610 that require that system attribute for authentication. If the name can't be harvested using a program then the owner preparing these files for protected use must input the name of the computer system that intends to open and access the files 642.

The final section 650 provides additional generate actions 652 for the PI as it builds the access rules file and prepares the files for exchange. The first example option allows an encryption key to be uploaded in those cases where the file has been pre-encrypted by the file owner. Authentication will still take place but the system attribute will not be used to encryption and decryption the file, it just assists in the step of allowing decryption to take place. This might be for a specialized file that has already been encrypted before being given to the PI, or it could be used to replace the generated key. Other embodiments might not let the user override the key generated within the PI. In some embodiments it might be possible to merge the access rules with the file access monitor to allow sending just one file to the accessing computer. In this embodiment the protected files might be later retrieved by the file access monitor once authorization was achieved. Next in this embodiment the user is given the choice to have the files prepared to send immediately. This might be allowed for files with Just-in-Time encryption 614, or it may not be allowed for those specific files. The final example in this embodiment allows the user to select an output name for the access rules file. This file might be used later it could be emailed to a given accessing computer or used in some other way. In other embodiments other choices could be present, for example to allow the access rules to be merged with all the files into one package for delivery, or there could be an explicit file download section and many other options in other embodiments.

Figure 7:
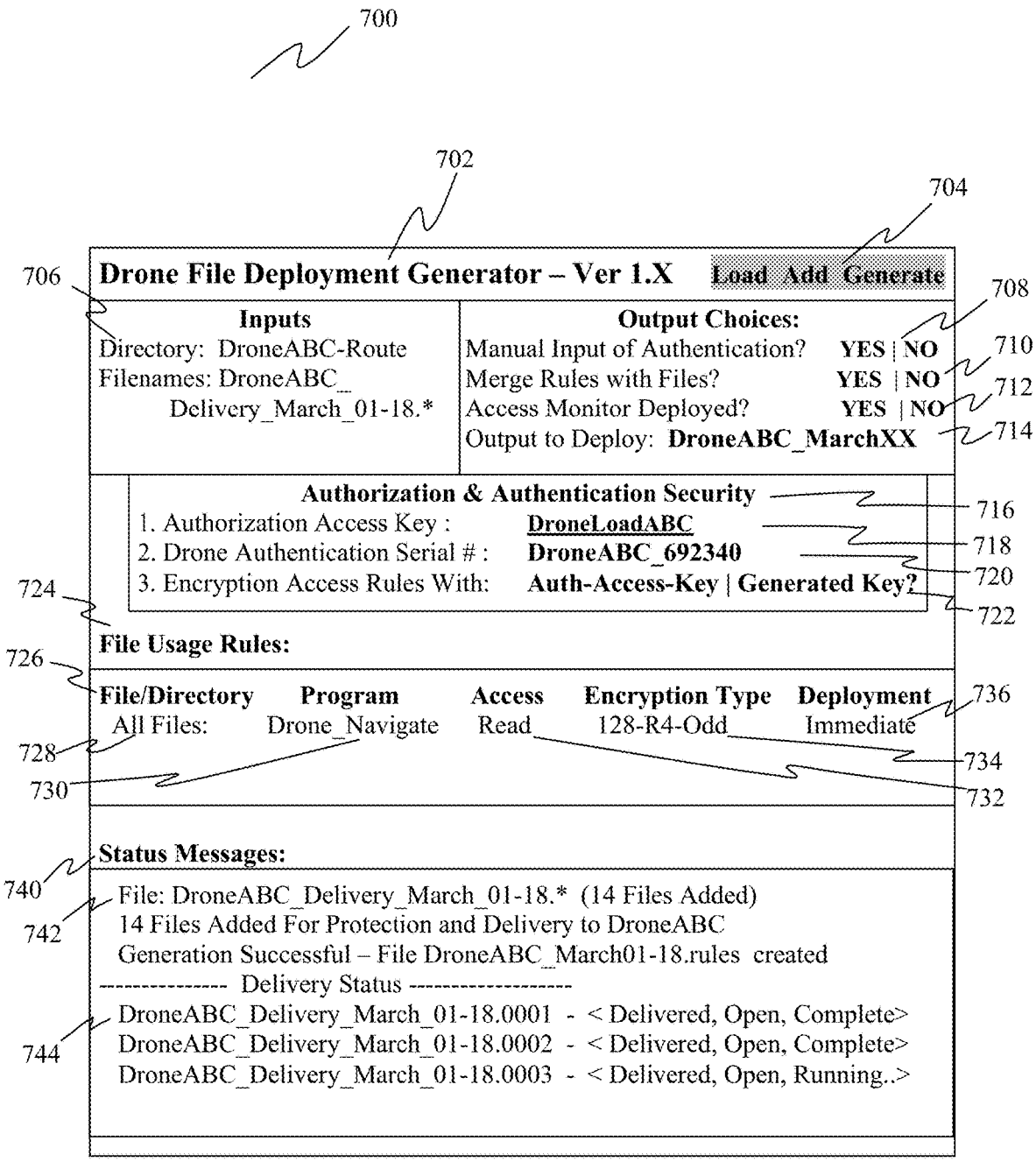
FIG. 7 is an illustration of another embodiment showing a programmatic interface that could be used in an autonomous vehicle environment to prepare access rules for delivery to an accessing computer.

Turning now to FIG. 7 there is an illustration 700 of another embodiment showing a programmatic interface that could be used in an autonomous vehicle environment to prepare access rules for delivery to an accessing computer. Although several of the functions and choices are similar to previous figures some new choices have been added or extended to illustrate the flexibility of the system. The title 702 reflects the specific nature of the Drone File Deployment Generator 702. The commands 704 are unique for this illustration and are designed to allow the user to load previous access rules, add a new file to an existing set of access rules and to generate a new set of access rules. Other embodiments might have further menu choices to delete old access rules, update existing access rules and other similar choices.

The input files 706 shown is one wild card name "DroneABC_Delivery_March_01-18.*". This is to represent delivery route GPS files for the autonomous drone known by identification "DroneABC". In other embodiments a re-occurring growth-based design file might be sent to a growing machine to update a growth regiment that has been previous tried and needs improving. The filename might look the same but the extension might have an increasing number representing the number of attempts that have been tried to improve the plants growth yield. In these embodiment the files to be used can be found in directory Done-ABC-Route 706. In other embodiments the files could be all listed individually or they could be listed by the package they are related to. The file is for delivery of packages for the first day of March, in the year 2018. The "*" indicates that any files that match this string will be used. As indicated from the Status Message area 740, there were 14 files located 742 all matching that string and having a sequence of 0.0001 to 0014. At any time of the day additional files could be added through the Add command 704 and the file could be delivered to DroneABC using the communication methods already established. The same encryption key and authentication could be used for the encoding of the file.

The output choices 708 to 714 are similar to previous figures but have some differences. The first choice is to confirm that manual input of the authentication value is required 708. This indicates whether the file access monitor running inside the drone can programmatically access the drone's serial number. As shown below in the Authorization and Authentication Security area 716 there are several required keys and serial number values required for deployment of files to any given drone. In some embodiments the person running the Drone File Deployment Generator 702 must manually input the system attribute for authentication if the drone does not offer this functionality. The next choice allows the user to merge the access rules with the files 710 for delivery to the drone. This would happen at the start of the day but if additional files 706 were added later by utilizing the add command 704 then the merge would not be needed. The next choice confirms that the access monitor is already on the drone 712 and does not have to be resent and loaded. If the user answers no then a file access monitor executable would also be merged into the same bundle as the access rules and files for delivery to the drone. The final choice is to pick an output filename that will be delivered to the drone with the access rules, files and possibly the file access monitor 714.

Next the user will proceed to adding authorization and authentication values used as access keys and encryption values 716. For this embodiment a multi-phased authorization and authentication has been established that requires some manual input from a technician at the drone itself before sending it off on deliveries. These values are first prepared and set up in this section 716. Having the technician manually input the authorization access key at the start of each day improves quality, reliability and reduces mistakes. Having a physical person present when the initial routes are loaded at the start of the day is also prudent way to load an autonomous drone delivery vehicle. In this section 716 the first step will be to configure the authorization access key that must be entered by the operator 718. This might require them to type the value on the keypad provided at the physical drone itself. There could be an interface supported over WiFi or Bluetooth to the drone from a handheld device or mobile phone. Next in this embodiment requires the user must locate and attached the drone's internal authentication value 720 which is a serial number in this embodiment. In some embodiments this system attribute can be harvested and it might be possible for that program to be run from within this Drone File Deployment Generator interface 702. In this embodiment the value selected for authentication is the Drone's internal serial number. In other embodiments this could be a random number that changes each day built within the drone, it might be a personal identification number, it could be a security token number entered by the operator or many other values. In some embodiments it might be required that an embedded security code within a chip accessible by the CPU of the drone is required. This would be similar to having a chip on a credit card that contains a PIN that has been programmed ahead of time for confirmation purposes. This value will be present on the owner's computer system and used for the authentication handshake and encryption process. In this embodiment the drone code will be used to encrypt the files sent. In this embodiment the system attribute could also be extended to 128, 256 or 512 bytes of information to improve the security level of the files sent. Using this secondary authentication step for encryption and additional verification further improves security, reduces counterfeit files being used in DroneABC and forces an additional decrypting of the files after decryption of the access rules. Finally the user can decide if they will use the authorization access code to encrypt the access rules or generate a specific encryption key 722. Generating the encryption key could use one of many methods already discussed, for example the movement of the mouse to generate random information.

As illustrated briefly in FIG. 6 the target file restrictions within the File Usage Rules 724 shows what access is allowed to take place on the files. The choices on which restrictions 726 to make configurable is flexible and many embodiments are possible. In this embodiment the user can indicate that the restrictions to be selected apply to all files 728. The program that is allowed to open and access these files is a program called Drone_Navigate 730. This means that no other program can touch these files and if a hacker tries to load another program and open the files or access them it will not be allowed. The accessing program will only have Read access 732 but in other embodiment it might be possible for the operator to be given read and write access should a route need to be updated. The encryption type 734 used must be known by the server and PI 702 and the file access monitor. In this embodiment an encryption type of 128-R4-Odd has been selected 734, which could have a range of different meanings. For example this value could indicate a 128 byte long encryption key, using RC4 encryption method taking only odd characters from the authentication system attribute provided. The deployment method is immediate deployment 736, which indicates that the files will be immediate encrypted and can be sent at any time. This will be useful should additional files be added and sent to the drone after the initial group were delivered.

The final section for status messages 740 provides feedback on the various operations performed by the user 742 during the creation of the access rules, the loading of previous access rules, the adding of files to existing access rules and the generation of the access rules 742. In some embodiments the Drone File Deployment Generator 702 program could also provide real-time feedback as to if and when the file is opened and is being accessed by the drone yet 744. This might be valuable at the head office to determine how the pace of package delivery is proceeding with each drone in the field.

Figure 8:
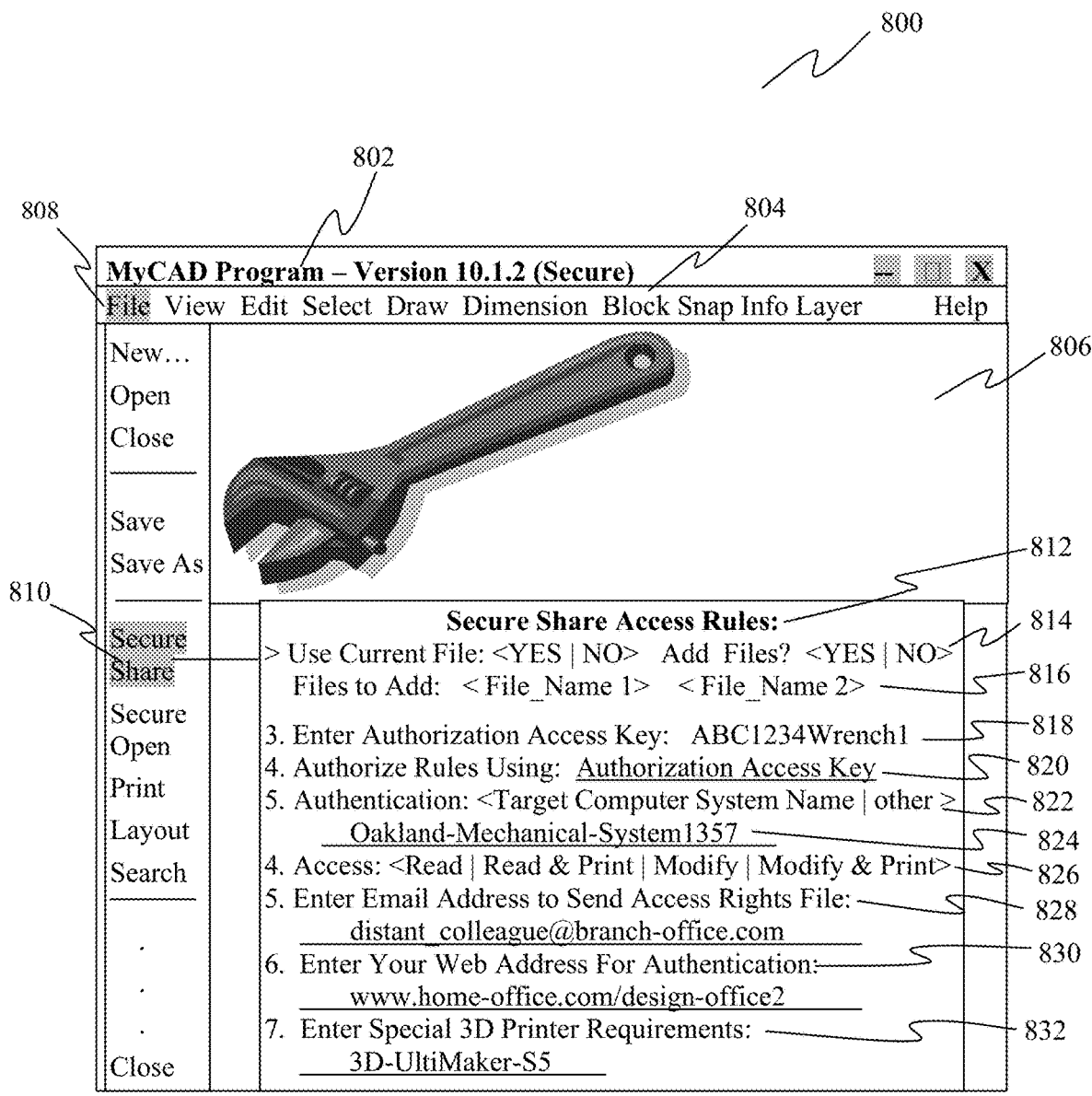
FIG. 8 is an illustration of another embodiment showing a programmatic interface that could be used in embedded program environment to prepare access rules for delivery to an accessing computer.

Turning now to FIG. 8 there is an illustration 800 of another embodiment showing a programmatic interface that could be used in embedded program environment to prepare access rules for delivery to a file accessing computer. In this embodiment a Computer Aided Design (CAD) program called MyCAD Program 802 is being operated by a user to create a drawing 806. It is a special version of the MyCAD Program 802 as it is version 10.1.2 Secure, implying it has security updates installed for securely sharing design files. In other embodiments there could have been many other possible programs for example a medical application for loading, viewing and accessing patient information, a virtual reality (VR) application designed to load advanced VR files into a verified VR headset and many, many others. There are many commands 804 at their disposal for operating the program and a complex user interface to manipulate the files being created 806. In this embodiment the user first selects a 'File' command 808 where a sub-menu called 'Secure Share' 810 option exists. By selecting the Secure Share 810 option they bring up the Secure Share access rules screen 812. There are other options as well for example the Secure Open option will be used in subsequent diagrams to make use of the shared files.

As with other access rules configuration the user must select which files they wish to share 814, 816. They may choose to simply share they file they are currently working on and no others 814. They may choose to add additional files to the access rules 814. They might decide to do this if ancillary files are present, like associated parts, sub-parts of sub-designs 816. They might have previous iterations of the same design to share to show a progression or many other reasons to add additional files 816. If more files are required the user can then select them 816 using one of many methods, for example a browse and pick type method. Since a secure share implies the user wants to share immediately an authorization access key is required immediately 818. There have been several embodiments discussed on how the authorization access key could be used. In one embodiment the authorization access key will be used to either to retrieve an encryption key. In another embodiment it will be used in some fashion as the encryption key for the access rules themselves. Several embodiments have been discussed for extending a shorter string to make a longer encryption key value. Possession of the authorization access key 818 effectively confirms legal rights exist to open and access the files provided. Therefore this value should be provided very carefully, ideally out-of-band from any other electronic mails being exchanged with the accessing computer. Out-of-band in this context means using a different communications medium, perhaps a voice phone call, or an SMS text message or some other communication method. The next step is to provide identify which system attribute will be used to support authentication. This authentication value will allow the accessing computer to unlock the files themselves 822. In this embodiment the main selection is to use the Target Computer System Name as the system attribute for authentication 822. In other embodiment this value could be another system value, printer code, security token. For example in some embodiments when people of the same company are collaborating across great distances a common security token system might be in place for this purpose. In other embodiments it could be a certain code within a smartphone or it could be many other possible values. This value 824 could have been provided by the user at the accessing computer who wishes to use the protected files or it could be harvested using a specialized program. Next file permissions are determined for the one or more files associated to the access rules 826. The sender might only want the receiver to view the files and offer comments or opinions. The sender might want assistance with the design and be asking for modification to be made. Perhaps a physical 3D print would be allowed. There are many embodiments that are possible here and these four are shown for illustration purposes 826.

In this embodiment the next option presented allows the file owner to send an electronically mail message to inform the access computer how to gain access to the protected files. This is one embodiment to exchange some information, in other embodiments the user at the accessing computer might have to come to a web site that will have all the information needed to gain access to the files. This is a simple procedure to implement and exchange the information but many other choices are possible. This message could also contain an attachment with the access rules and protected files included. This embodiment showing a sample electronic mail message is illustrated in FIG. 9. The authorization access key will still be needed to start the process and gain access to the access rules, this will provide proof the accessing computer has rights to receive and unlock the access rules. In some embodiments where the authorization access key is not used to encrypt the access rules the user must provide a web site address 830 to verify the authorization access key. The web address contains the supporting web server software with a database that associates authorization access keys with matching encryption keys. As discussed this does require the ability to open a secure connection between the accessing computer and the web server. In other embodiments where the files are not provided in the email sent to the accessing computer, the web server support software must also be able the files to be exchanged 814, 816 and hold them until both authorization and authentication is confirmed by the file access monitor. As discussed early there are also embodiments where encryption keys are negotiated so they are different for every accessing computer. In these embodiments the web server will perform a key negotiation to generate a new encryption key. This process has been discussed and would use a protocol like encrypted key exchange (EKE), Open key exchange (OKE), Simple Password Exponential Key Exchange (SPEKE) and newer advanced Quantum-safe Diffie-Hellman methods like Supersingular Isogeny Diffie-Hellman (SIDH) or Learning with Errors (LWE) key exchanges. Once the key is created and shared between the two ends the file access monitor will be able to open and allow access to the access rules. This same negotiated key could also be used once authentication is verified by the file access monitor. The system is flexible enough to allow the system attribute used for authentication not be directly involved in the encryption and decryption process.

In this embodiment the final configuration choice listed is to include the open or more 3D printers that must be used should the accessing computer be granted rights to print the 3D design that is being sent 832. This is a secondary system attribute that might be required for authentication. The qualifying steps of authentication could require one or more steps, it all depends on the requirements established by the file owner. There could be several compatible 3D printers listed or a blank field indicating that any 3D printer could be used. In other embodiments there could be other choices and options to be entered by the user. This subset provides a good example of how to use the ideas of the invention embedded within a larger application.

Figure 9A:
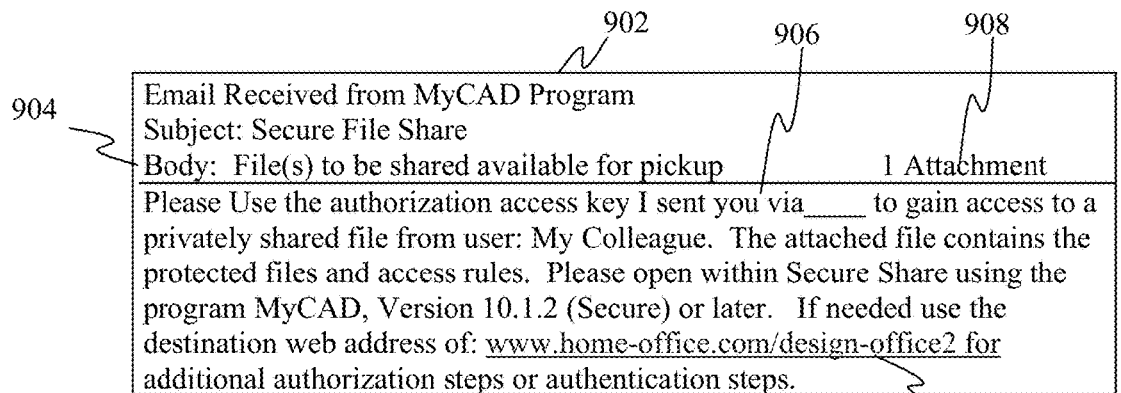
FIG. 9a is an illustration of a sample electronic mail message that would be received from an embedded system preparing files to be securely sent to an accessing computer.
Figure 9B:
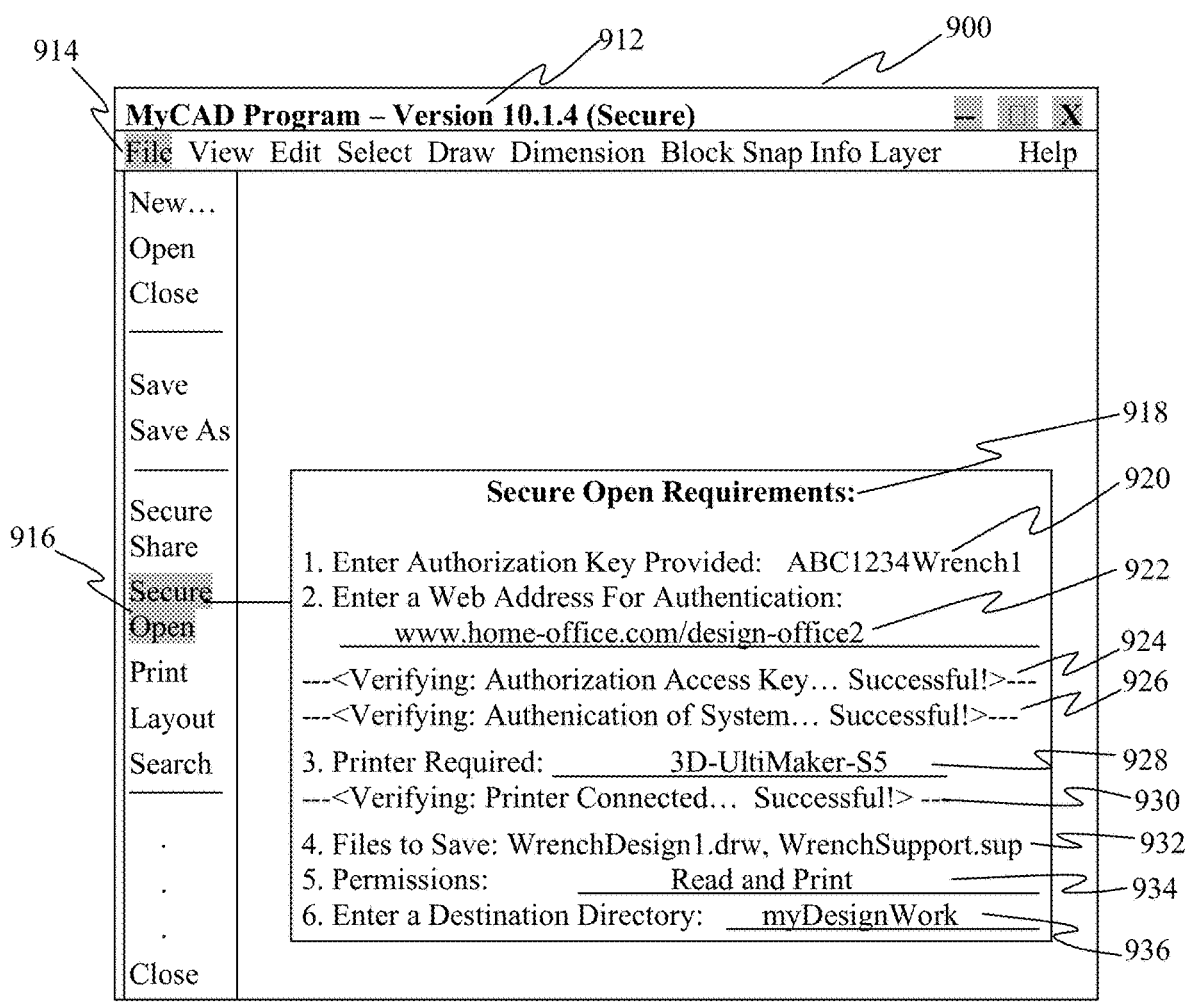
FIG. 9b is an illustration of another embodiment showing an embedded user interface that would use the file access monitor logic to provide access to the protected files.

Turning now to FIG. 9a there is an illustration of a sample electronic mail message 902 that would be received from an embedded system preparing files to be securely sent to an accessing computer. In this embodiment FIGS. 9a and 9b are illustrations that make up two independent screens to assist the accessing computer in accessing the protected files. The first screen is a sample email 902 received from a sending computer system indicating that shared secure files are available for pickup 904. The remainder of the message indicates that one or more files are available and reminds the accessing computer to use the authorization access key provided via some other communications method 906. Sending the authorization access key in this email message would have weakened security and increased the chances of an email hacker gaining access to the access rules and decrypting them. In this embodiment the email message also contains an attachment 908 which can be 'Opened' using the secure share part of the listed program. To assist the accessing computer the program MyCAD, Version 10.1.2 (Secure) or later must be used. The accessing computer can used this email message and copy and paste and the destination web address 910 into the supporting application if needed. In this embodiment the file owner decided not to require a secure communications link but will use the authorization access key as the encryption key to the access rules. The email also indicates the type of program that is required, its version number and secure support option. These will help to guide the user so they are able to confirm their ability to access the files. The supporting program be it a CAD program, a medical application, a Virtual Reality program to load advanced files into VR headsets or some other program will be able to open the attachment and start the process of accessing the secure files. Finally a web server address is provided 910 so the program, MyCAD can perform any necessary steps to pass the qualifying steps of authorization and authentication. This might involve verification of the authorization access key; it might involve retrieving encryption key values or perhaps other verifying steps.

Turning now to FIG. 9b there is an illustration of another embodiment showing an embedded user interface 900 that would use the file access monitor logic to provide access to the protected files. FIG. 9b is the same accessing computer or accessing computer system that received the electronic mail message 902 discussed in FIG. 9a. In this embodiment the accessing computer then runs the target application 900 with the file access monitor's logic embedded support 912, with a version equal to or greater than the sending application with the word 'Secure' shown. The accessing computer selects the file menu option 914 and the Secure Open 916 sub-menu option. This will cause a partial screen to open for to allowing them to fulfill the Secure Open Requirements 918. Step 1 requires them to enter the authorization access key 920, which will have been received in another message, via a phone call, SMS text message, BlackBerry Messenger message or some other out-of-band communication. The second step is to enter the destination web address that may be needed to facilitate the file exchange 922 by verifying the authorization access key 920 or by assisting with authentication. In this embodiment the authorization access key 920 is also the decryption key and using one of several embodiments discussed the embedded file access monitor logic will determine this. Once these pieces of information are entered the embedded logic can verify the authorization access key 920 by attempting to decrypt the access rules or by communicating with the web address 922 provided to verify the authorization access key 920 entered. If the decryption of the access rules is successful 924 the information necessary to perform authentication can take place. In this embodiment the qualifying steps of authentication involve accessing the internal computer name and comparing it to the provided computer name. If this is successful 926 physical authentication of the system is complete and any additional authentication steps can take place. In this embodiment the file owner has already required a certain type of 3D replication machine be attached to the system 928. Once this 3D printer is found and verified 930 full authentication is complete and decryption of the files can take place. In some embodiments the system attributes might not be used for encryption of the files. In these embodiments the decryption of the files might involve retrieving an encryption key from the server name provided 922. In other embodiments if the files had not been provided the file access monitor logic might negotiate a brand new key, encrypt the files and deliver the files to the accessing computer.

Once authentication is complete other elements of the access rules can be displayed, for example the file name 932 and the file permissions 934, which is read and print in this embodiment. In this embodiment the files sent were one or more 3D design files and they are simply listed. In other advanced interfaces this could be pull-down menu where the accessing computer might be able to highlight one to open immediately or many other possible advanced actions. Finally the user is requested to provide a destination directory where these newly files should be saved in their encrypted forms 936.

There could be many additional restrictions and additions to this sample embedded menu example. For this example these requirements illustrate the concept of embedding the file access monitor design logic into a larger application. In other embodiments in place of a necessary 3D printer the file access monitor logic might search for an attached x-ray scanner, a VR headset, a movie projector or some other type of hardware device.

Figure 10:
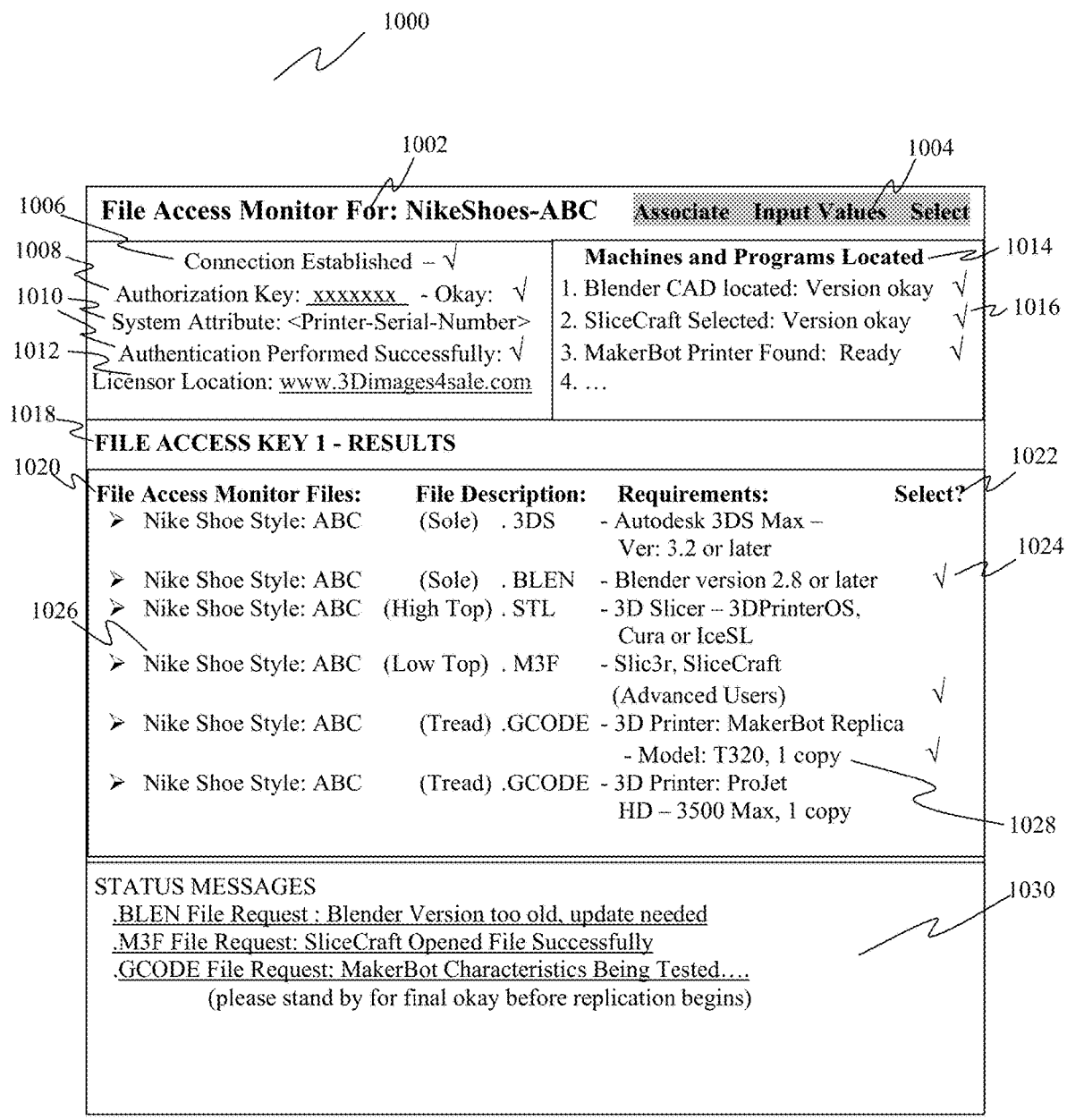
FIG. 10 is an illustration of an embodiment showing a user interface that would be used by an accessing computer to provide access to the protected files through the file access monitor.

Turning now to FIG. 10 there is an illustration 1000 of an embodiment showing a user interface that would be used by an accessing computer to provide access to the protected files through the file access monitor. Although the UI 1000 shown is detailed it is just one possible representation and has been tailored to an easily depictable format for this application. For example the menu items for taking action 1004 do not show a sub-category of selection. These sub-actions will be described in detail. The number and permutations of screen layouts can be infinite and varied depending on the computer system be used, the O/S, whether it is a specific program or being run within an Internet web browser as a series of HTML commands, or as a stand-alone computer program. In this embodiment the title provided is File Access Monitor for NikeShoes-ABC 1002, where ABC is supposed to represent the model, brand or type of the shoe. This could be a SKU number or even a product code for the licensee. Any title could appear here the goal is to create a descriptive title to help the licensee to distinguish it from other licensed products that may have also come with a file access monitor. The file access monitor user interface, termed UI in this figure also provides a few menu items 1004. These are simplified and could vary between different types of file access monitors. For example a medical-based file access monitor might include print x-ray files, or open MRI or perhaps others.

When the file access monitor is installed and running it establishes a connection 1006 with the licensor's configured location 1012. The user can then input the authorization access key 1008 and verification can take place with the licensor 1012. In this embodiment the authorization access key 1008 is input and then hidden from view and shown only as several 'xxx's all in a row. Although the user at the accessing computer might have manually entered the authorization access key 1008, in other embodiments it could be received over Bluetooth from a smartphone, a code received through Near Field Communication (NFC), it could be an RSA security token value that must be typed in or some other value. With the authorization access key confirmed 1008 one or more final qualifying steps for authentication can take place. In this embodiment authentication is required through the system attribute identified as a 3D printer serial number 1010. The actual value is never sent to the accessing computer and how the system attribute is to be used or verified is also not displayed and known only to the file access monitor. The file access monitor takes this direction from the access rules and looks for a matching 3D Printer. In other embodiments this might be a computer system name, computer serial number, operating system license or some other hidden system value. In some embodiments with this value in hand the file access monitor might now be able to decrypt the files directly. In other embodiments the file access monitor sends the system attribute to the licensor's provided location 1012 for verification. In other embodiments the licensor provides a decryption key for the files and in other embodiments an encryption key is negotiated. Once the system attribute is found and verified the authentication step is considered completed 1010. Once authorization and authentication are complete the files associated to the access rules that are being protected by the file access monitor can be listed 1018. In this embodiment only one system attribute has been requested by the file owner 1010. In other embodiments it would be possible accessing computer might have to provide several different system attributes to gain access to several files or file groups. In other embodiments each file might require a different authentication methods and different system attributes required. In previous examples the files were protected with serial numbers of peripheral devices, security tokens and DNA genome sequences.

In this simplified embodiment a title for this section is provided 1018 showing which file access key has been used to open the one or more files being listed. Below the title is a detailed listing of the one or more files and providing more information about each file and the open and access requirements. Below the main title is a highlighted sub-title 1020 that provides a list of items related to each file being listed. The items listed in this title 1020 could vary depending on the type of files being listed. This embodiment is listing different 3D design and render files so particular items related to this file type are shown. In other examples the title line could include target vehicle names, the different locations included with the navigation data. The title could include printer material needed, total amount of material to print a 3D object, the DNA genome of the material to be printed or different VR headset types and values. With each file 1026 one or more methods or programs are listed that can access the file 1026. The user can select which file they wish to access 1022 by using the associated "select" menu item 1004. This might bring up a sub-menu with the associated list of programs the user can select from. For example in the illustration the user could select a 3D slicer program Slic3r or SliceCraft (for advanced users) 1026 and they selected SliceCraft 1016 as shown in the Machines and Programs located 1014 area. Once the association is made between the file name and SliceCraft 1016 the file access monitor will enforce this association so that no other program can access the file. Each time a file is selected 1024 the file access monitor checks the computer system to find the program and its version, make and model. It does this using system level services that are available, for example using the system registry and other know methods to finding installed programs. As each file's requirements are met the Machines and Programs Location 1014 confirms the success of their actions 1016. In the case of a file access monitor designed specific for working with 3D replication machines the number of allowed print jobs, or copies can be included with the printer information 1028. Displaying the number of allowed copies left available to the user 1028 helps to inform them exactly what rights they have purchased and in this example that just one physical copy of product remains. The file access monitor will block any attempts to 3D print a file after the number of allowed copies has been replicated and will not decrypt the files. The status area 1030 helps to guide the user with steps, tips and problems that are encounter as they perform various actions.

Once the files are selected and access is verified by the file access monitor the user interface (UI) portion of the program can be exited. This will leave the system level portion of the file access monitor running in the system until the user terminates it. Now as the user can see all the selected and verified filenames in the system along with all other files in the system. These file are different as they are encrypted and are useless to anyone without the file access monitor running with its ability to decrypt these files. If the user terminates the file access monitor from the system completely they are also unable to open and access the associated files. With the file monitor running if a program like SlicerCraft 1016 tries to open the Nike Shoe Style ABC—low top 1026 the file access monitor downloads the decryption key and unlocks the file. The decryption key is kept in temporary (RAM) memory while it is running and if copies of the file are saved they are encrypted using this key. During this period the user will be unable to terminate the file access monitor from the system all attempts to do so will fail. Only once all monitored files are closed will it be possible to terminate the file access monitor from the system. In this why protection must be maintained at all times when the decrypted files are actively being accessed.

Figure 11A:
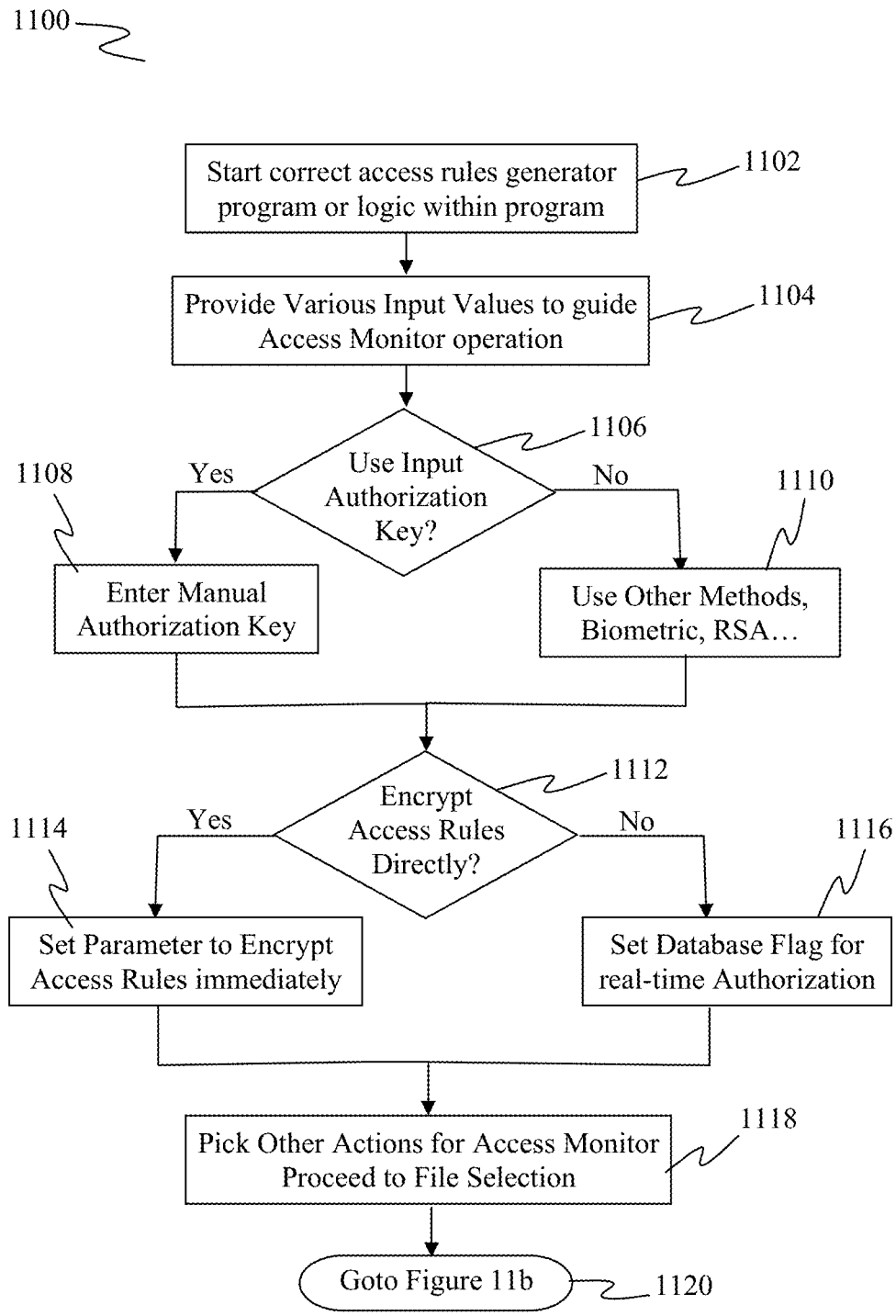
FIG. 11a is a flow chart showing one embodiment of the steps the licensor or file sender could to take in order to prepare authorization and authentication steps to gain access to the protected files.

Turning now to FIG. 11a there is a flow chart 1100 showing one embodiment of the steps the licensor or file sender could to take in order to prepare authorization and authentication steps to gain access to the protected files. The first step for the licensor is to start the correct access rule generator program or generator logic within a program 1102 for a given set of files. There could be several different generators depending on the type of files that are being protected. Different access rules and different file access monitors have targeted functionality so the file access monitor and the access rules generator are intrinsically tied. These two components are functionally coupled to understand what features and functions are supported in any given system. The user then begins to input values 1104 as illustrated by many previous figures. For example in some embodiments they will input the authorization access key, in other embodiments they generate the encryption key, in other embodiments they decide how to bundle the access rules, the file access monitor and the related files. In some embodiments they also input a web address of the Licensor or the licensing agent where the authorization and authentication access keys will be validated for the authorization and authentication stages. In some embodiments the user will also input the output file name to be used for delivering access rules and in some causes the bundled access rules, file access monitor and related files.

The user then determines how to input the authorization access key into the system. In some embodiments this will not be an option as the system of protection will be pre-determined by the software being used. For example if a security token server Application Program Interface (API) is available then perhaps a security token is selected for this group of files to this particular user and a value is automatically assigned. In this embodiment the user is given a choice 1106 to input a key or have one automatically assigned. If the user manually inputs a key 1108 an interface is provided that might require a certainly length or complexity of characters be entered by the user. If another method is selected 1110 or forced upon the user by the interface software 1110 then that method is used. For example a biometric sample from the licensee might have been collected, like a fingerprint, breath sample, retina scan or some other unique, identifying feature. As mentioned a security token might have to be given to the user and the value of this token and its current value provided. Security tokens can have an ever changing random number that can be used as a seed value for encryption or used for verification to allow for the negotiation of an encryption key later. With the authorization access key selected the choice is given to encrypt the access rules directly 1112 or encrypt them later when requested by an accessing computer system. Encrypting them later allows for a just-in-time encryption strategy where the encryption key is negotiated only when it is needed and it could change every single time a request is made to decrypt the access rules 1112. In some embodiments this choice will not be given to the user and the most secure method will be encoded in the generator logic. In this embodiment if the user selects to encrypt the access rules immediate 1114 a flag is set within the generator to perform this at the final stages of generation. The software then allows the user to select other options 1118. Otherwise a database flag is set for real-time authorization and encryption and the user moves to pick any final options 1118. With all these choices made the user can then move to select different files to protect 1120 as illustrated in FIG. 11*b*.

Figure 11B:
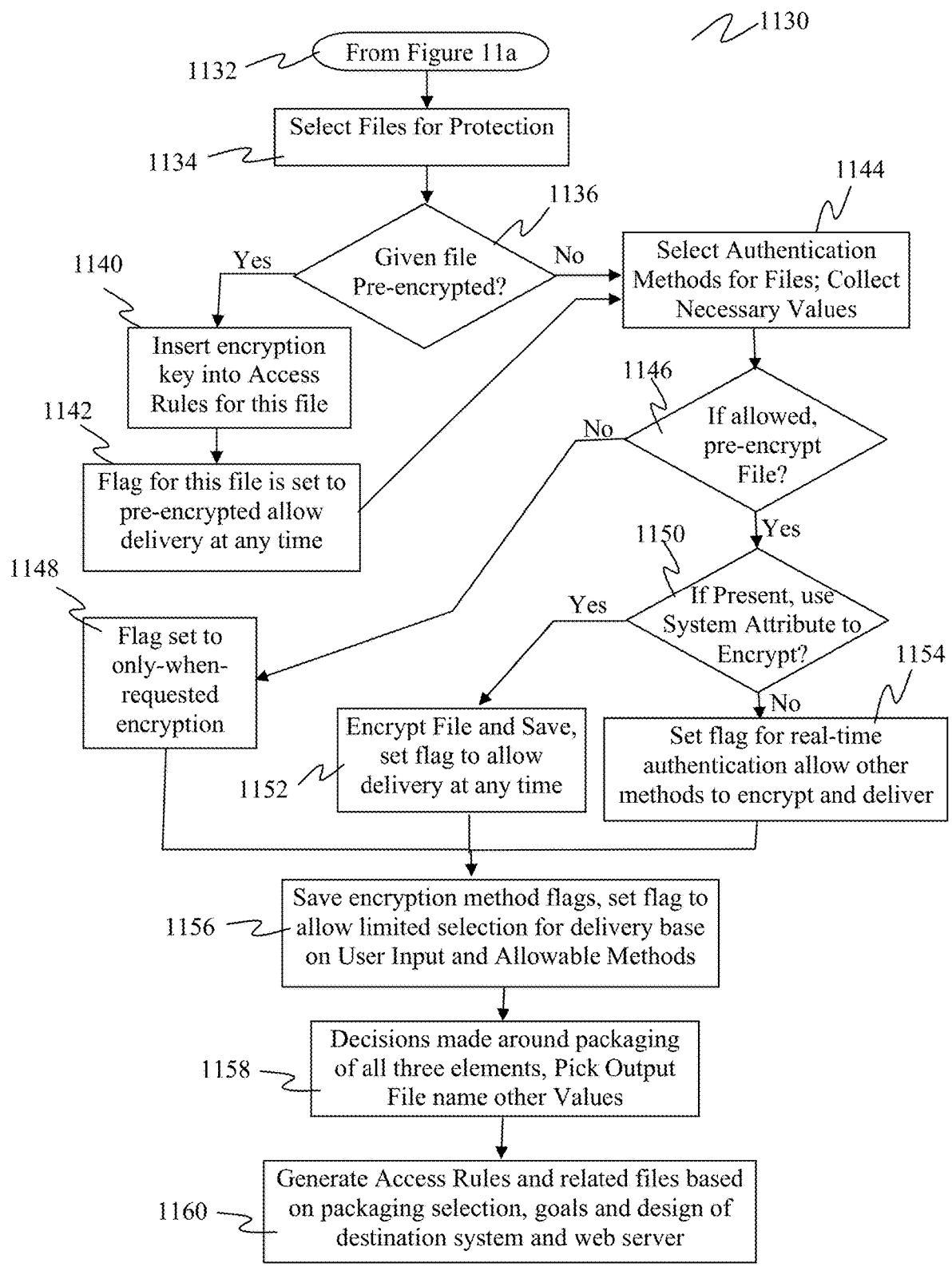
FIG. 11b is a flow chart showing one embodiment of the steps the licensor or file sender could to take in order select files and prepare the access rules for delivery to an accessing computer.

Turning now to FIG. 11*b* there is a flow chart 1130 showing one embodiment of the steps the licensor or file sender could to take in order select files and prepare the access rules for delivery to an accessing computer. Once the user has selected a first set of qualification steps for the access rules and a few initial options in FIG. 9*a* they proceed to FIG. 9*b* 1132. The user then begins to add files 1134 meant for association to this access rules file or in some embodiments a set of saved access rules. For each file the user then indicates if the file has been pre-encrypted or not 1136. If the file has been pre-encrypted then the encryption key is placed into the access rules 1140 and the flag is set to pre-encrypted within the access rules 1142 and delivery of these files is set to anytime. Then the user proceeds to select a system attribute for authentication 1144 of the newly added file. Having dealt with pre-encrypted files or if the file is not pre-encrypted, the user can select the authentication method that is to be used from a list of authentication methods offered by the access rules generator 1144. There have been many embodiment discussed in earlier figures for using different system attributes for creating different authentication methods. Whatever method is selected the matching authentication value is collected and given to the generator 1144. If a harvesting method is selected this simply defers the collection of system attributes to a time when the accessing computer is about to purchase or acquire the files in some way. In these embodiments the system attributes will be added to the authentication database and associated to this set of access rules and these files. Based on the authentication method selected the user might be able to pre-encrypt the file 1146. For example if a security token is used as the encryption key then only when the file is requested can the current value of the security token be used to create the just-in-time encryption value. In this type of embodiment the user might be forced into making this selection and the option is automatically made for them. If not allowed 1148 set a flag to only-when-requested encryption 1148 and proceed to the next step. If pre-encryption is allowed 1150 then the user can decide to use the system attribute to pre-encrypt the file 1150. In some embodiments when the system attribute has been used to pre-encrypt the file the file access monitor can directly decrypt the file without communicating back to the server or PI. If the system attribute is present then the user is allowed to decide to go forward and use this system attribute to encrypt the file 1152. In this case use the system attribute to pre-encrypt the file, save the file and set flag to allow delivery at any time 1152. Allowing delivery at any time 1152 does not restrict the delivery but allows the maximum flexibility for determining when to delivery and how to deliver the file. In those embodiments where the file is pre-encrypted the file owner has more flexibility regarding the delivery method used on the file when sending to the accessing computer. If the system attribute is not present, or the user decides they do not want to use it for encrypting the files 1154 then a flag is set to indicate that real-time authentication is to be used. The user is also offered a chance to use another encryption method for the files, for example they could generate their own encryption key specifically for encrypting the files. In this case the files could be pre-encrypted with this new encryption key and the flag would be set to allow delivery at any time 1154. In other embodiments the user simply decides not to use the system attribute for the encryption value and selects to perform just-in-time encryption on the files 1154. In this embodiment the user might select to perform a key negotiation to protect the files using some advanced cryptographic solution like a Quantum-safe encryption algorithm 1154.

The generator can now save the encryption method flag 1156 and allow selection for the delivery method 1156. Based on whether the file is pre-encrypted or has just-in-time encryption the user can still have some limited choice over how the file is delivered 1156. Some of these embodiments have been already discussed for example some of these methods include delivering at any time, delivering only-when-requested, or using a streaming delivery method to name a few 1156. Some choices mentioned may not be available based on whether the file has been pre-encrypted or not. For example delivery at any time cannot be used if the file has not been encrypted. If streaming encryption is used it means the file will be given to the destination application in small encrypted portions only. Once the selection is made by the user a flag is set for the delivery method 1156 and the user moves to the final selections. Once the delivery method is selected the user makes final decisions offered by the generation program 1158. This might include the output file name, ensuring the source location is present, generating an encryption key if not already complete and any additional decisions required by the generator interface 1158. Finally other advanced configuration parameters may also be provided by the PI generator based on the type and complexity of the files being protected. Next the user must also decide how to package up the three elements for the accessing computer 1158. The three elements could all be merged, only the file access monitor and access rules might be merged or the file access monitor, access rules and files could all be separate to name a few possibilities 1158.

Finally the user proceeds with requesting a generation of the access rules 1160 and related file access monitor and files depending on earlier choices. This may result in a single unified package, a package with the access rules and files, a block with just the access rules only. In some embodiments this will insert the access rules into a database and mark it available for sale. Purchases will cause the auto-generation of file access key and encryption keys as necessary and just when needed. Whatever the configuration selected by the user the generate step produces output that is compatible for the delivery system being build. If immediate delivery is planned to a licensee or accessing computer then an output file will be secured in such a way to enable secure delivery to that accessing computer. In embodiments where a file access key has been generated the system works with a web server to associate the access rules with that file access key. In embodiments where an encryption key is generated the web server associates the access rules with the file access key and the encryption key. In embodiments where a web storefront is used the output is integrated by the web server to ensure each set of access rules is associated to a purchase page for that one or more associated files 1160.

Figure 12A:
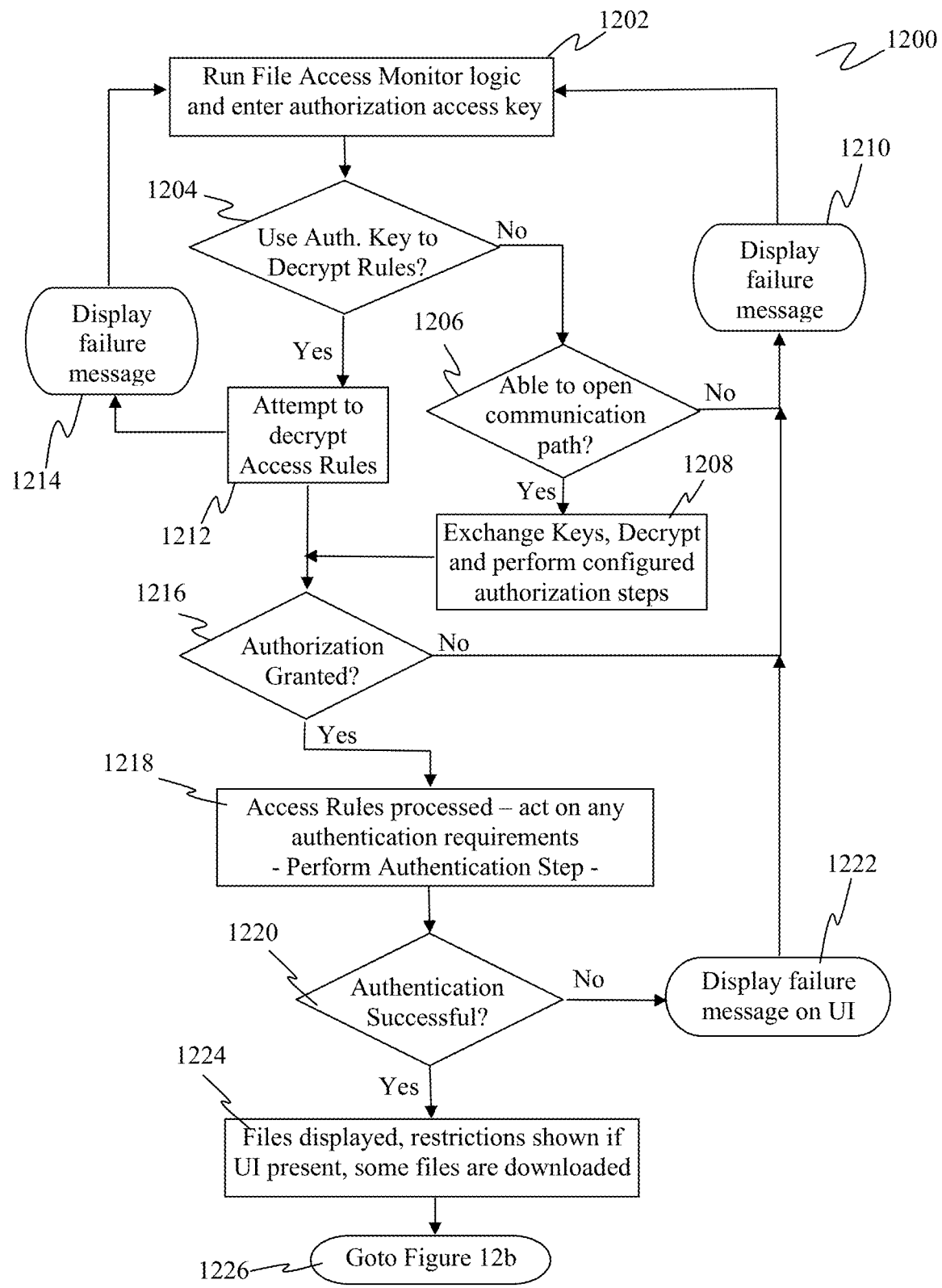
FIG. 12a is a flow chart showing one embodiment of the steps for the licensee to pass authorization and authentication in order to gain access to the protected files.

Turning now to FIG. 12*a* there is a flow chart 1200 showing one embodiment of the steps for the licensee to pass authorization and authentication in order to gain access to the protected files. The first step is for the user to run the file access monitor logic and access the user interface (UI) 1202. This logic could be a standalone program with its own UI or it could be embedded in another larger program. In some embodiments this will require the user to have downloaded the file and performed an installation. In other embodiments the user may have to install an extension to a web browser or purchase an updated software product that supports the file monitor logic. In those embodiments where the file access monitor is a standalone program it will present an icon in the active area of the computer system being used. For example in an O/S environment it can be visually indicated in the system tray as a small icon. Once this is done by hovering the cursor over the icon the user will be given the choice to 'open' the file access monitor. Similar interfaces can be used by multi-user video programs for access to a UI when direct interaction with the program is desired. Otherwise the program runs in the background undisturbed by the user. In other embodiments where the file access monitor is running within a larger program it is built into the core of the program so it is always operating to protect the files opened within the larger program. Without the file access monitor present the files cannot be decrypted and accessed.

With the file access monitor logic running the user can enter their authorization access key 1202. There are many possible embodiments to support this authorization step as discussed in earlier figures. With the authorization key the file access monitor can then decide to use this key to decrypt the access rules or whether it must communicate to a server to validate the authorization access key 1204. There are many possible embodiment to determine whether to use the authorization access key to decrypt the access rules. For example the file access monitor could look for a special code at the very front or back of the access rules file or it could simply attempt to decrypt the access rules and see if what results matches the format required to name a couple of ways. In other embodiments the file access monitor and the access rules generator might extend the authorization access key to 128, 256 or some long length of bytes to improve the encryption strength. If a communication path is needed the next step is for the file access monitor logic to acquire the destination web address in order to open a communication path 1206. In some embodiments the web path might be placed at the front or back of the access rules. As illustrated in other embodiments the path to the server might have been received via an email and entered by the user into the file access monitor interface. With this address in hand the file access monitor attempts to open a communication path to the configured source location 1206. In another embodiment the user running the file access monitor is prompted to enter the source location. In another embodiment several known source locations, perhaps like known Internet storefronts are configured within the file access monitor and they are all opened on behalf of the user 1206. However the information is acquired the file access monitor attempts to open a communications path to the configured source location 1206. If the communication path cannot be opened a message is displayed to the user as to indicate a failure occurred 1210. If this connection fails 1210 an error message is displayed encouraging the user to fix the data communications issue. They are returned to the UI and will be given various methods to attempt to re-open the communications path 1302. In one embodiment the file access monitor also has a continuous timer running and will re-attempt to open the communication path itself every time the timer expires. The communication path could be a wide area connection over a public network like the Internet to a publicly accessible web site. It could also be a private network address within a virtual private network (VPN) held within a single company's complex infrastructure.

When the connection path is opened successfully the file access monitor can deliver the inputting authorization for verification 1208. Once this authorization access key is transmitted to the licensor for validation 1208 the web server will return a decryption key to unlock the access rules. With the access rules unlocked the file access monitor can then determine if there are any additional steps in the authorization process and it performs full authorization 1216. If authorization is not successful an error message is displayed 1210 and the user is returned to the start of the process to enter a new authorization access key 1202. After several failed attempts the licensor might get suspicious of the file access monitor and could disable its functionality remotely. For example a hacker could be trying random codes in an attempt to steal the files monitored by the file access monitor.

If all the required authorization steps are successful the access rules will dictate what authentication steps are necessary to unlock the files 1218. Many embodiments have been discussed for dealing with the authentication stage. One or more qualifying steps might be necessary involving checking peripheral devices, looking at 3D printers, running a program to harvest values out of the accessing computer system, reviewing DNA material, using security tokens and many others. The full authentication is performed 1220 and if not successful an error message is displayed 1222 and the user is returned and the user is returned to the start of the process 1202. If authentication is successful all the associated files to be managed by the file access monitor are displayed to the user through the UI 1224. During this time for some embodiments the user is then able to go through the list of files and determine which ones they wish to have access to. As shown in previous figures they might have to select between different files of the same type or perform additional software confirmation checks. In this embodiment for each file they select a test is performed to see if they fulfill the requirements to gain access to that file 1224. In some cases depending on the setting for each file they might be downloaded to the accessing computer's system. Once the user has gone through all the files they wish to access they can exit the UI portion of the file access monitor. At any time the user can return to this UI and adjust which files they are using. For those files that allowed a wide range of programs to be used for access the user can also return and change the association made between a file and an accessing program. Once this association is made the file access monitor will enforce this assignment until it is changed through the interface. With the file access monitor UI exited the file access monitor runs in the background and the data flow moves to FIG. 12b 1226.

Figure 12B:
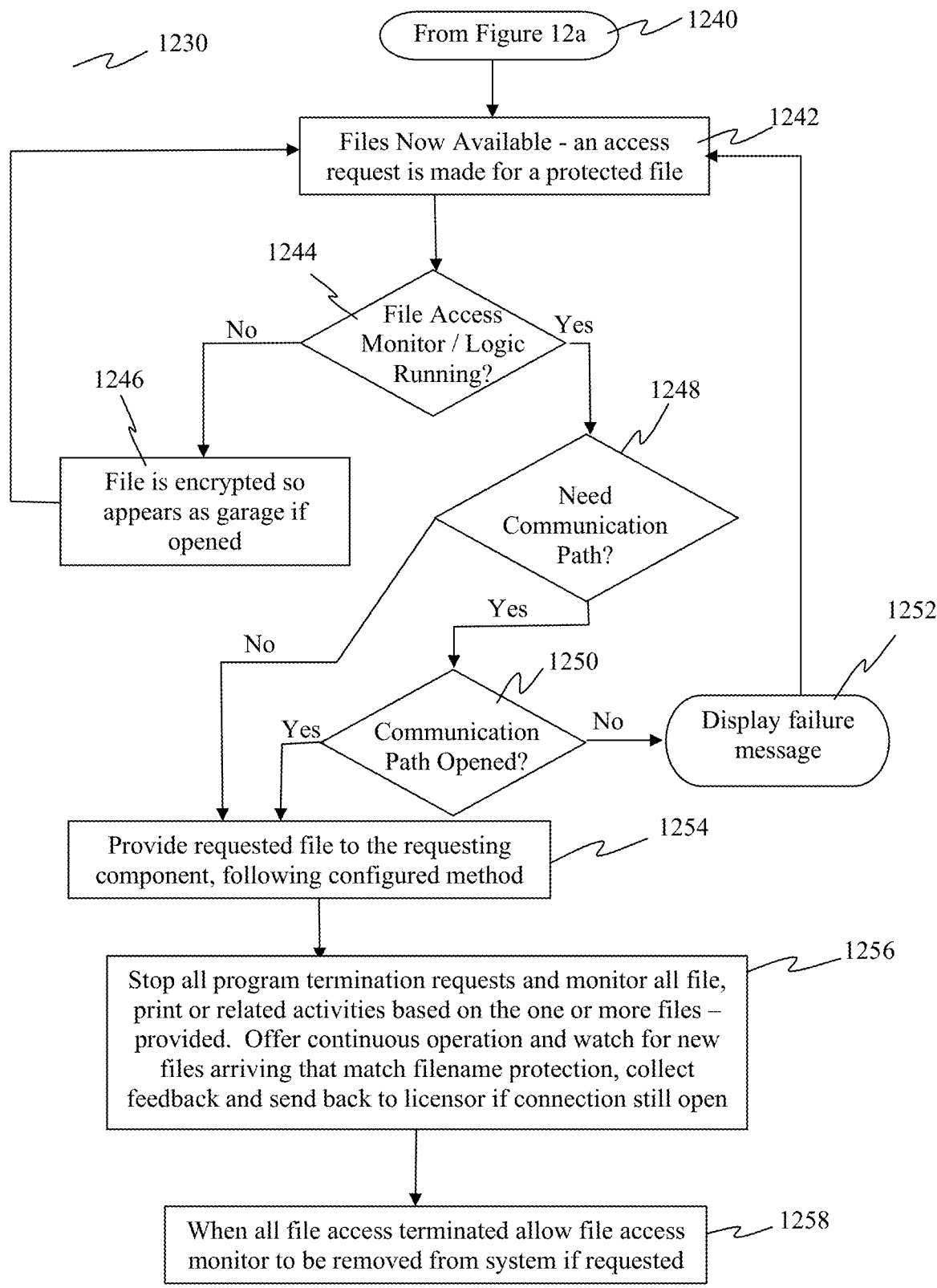
FIG. 12b is a flow chart showing one embodiment of the steps for the licensee to access the files once the file access monitor has granted full access.

Turning now to FIG. 12b is a flow chart showing one embodiment of the steps for the licensee to access the files once the file access monitor has granted full access. Whether the file access monitor UI is running or not the file access monitor is still active in the background within the system or in other embodiments running constantly within a larger application. To make the data flow understandable the two elements of the file access monitor have been divided into two figures and connected for convenience and readability. So with this in mind we enter FIG. 12b from the previous FIG. 12a 1240. However in several embodiment already discussed the file access monitor UI could be running and the file access monitor protection component could be running simultaneously. This means that even though the file access monitor UI is up and active the user on the accessing computer could also have a program up and running accessing a file under the protection of the background portion of the file access monitor. For this data flow a program makes a request to access a file under the protection of the file access monitor 1242. If the file access monitor is not running 1244 the file can be seen and opened but it will appear as garbage 1246. In another embodiment an error message is passed through the file open interface that indicates that the file being opened is encrypted. This process can continue indefinitely until the user trying to open the file realizes they must have the file access monitor up and running in the background of their system. If the file access monitor is running it checks various reasons why a communication path might be required 1248. For example if the access rules indicates that constant communication path is required and there is not a current communication path opened then it must attempt to open one 1248. In another embodiment the file access monitor might have an encryption key that has expired so it needs the communication path to acquire a new one. It might be the exact same encryption key it had before but after an hour, day, week, month or some other timeframe there could be a concern with keeping it around even in temporary memory. Advanced hackers can attempt to steal encryption keys even from temporary memory if given enough time and resources.

If a communication path is required the file access monitor attempts to open one to the licensor or licensing agent 1250. If that communication path fails to open 1252 an error message must be given to the requesting program to indicate the file is encrypted or that the file open has failed for some reason. In some embodiments the file access monitor might be able to put a system message onto the screen for the user to see the exact nature of the failure. If the communication path is opened successfully or if a communication path was not required to be opened, either because there was already one opened or one was not required, the file is opened and provided to the requesting program 1254. The file is provided using the method configured by the licensor. If the method configured is for streaming, only-as-needed encryption, the file is decrypted and only portions are provided to the requesting program. This method might be commonly used for movie or virtual reality type files. During this period of time with a file activity being used the file access monitor must ignore and disallow any attempts to terminate it from the system 1256. It closely monitors all file activities, for example printing, 3D printing, data communications and other activities of the requesting program to ensure all copies are monitored, all print and 3D print activities are allowed 1256. If new files arrive that match a wildcard-based filename the file access monitor will detect this and provide continuous protection on all files as they arrive in, match the correct filename and are encrypted with the correct key.

Only when the one or more files being protected are closed and all derivative copies are closed will the file access monitor will allow the user to remove from the system 1258. The user might do this to save CPU resources, increase the speed of their system or for some other reason.

The invention claimed is:

1. A computer system for protecting one or more files comprising:
   an accessing computer executing computer executable program code for a monitor application;
   a computer hardware device with an interface to list one or more files and selectable parameters to encode requirements defining permitted activities related to the one or more files into access rules encoded to be machine readable instructions for the monitor application to control access to the one or more files by the accessing computer system, the access rules being a set of parameters that are selected at the interface to define the permitted activities by the monitor application and the accessing computer system related to the one or more file, the interface displaying an access key that uniquely identifies the access rules encoded to be the machine readable instructions for the monitor application to control access to the one or more files by the accessing computer system, the access rules having directions for authentication of the accessing computer system and system attributes that are required to access the one or more files, the access rules encrypted for provision to the accessing computer;
   wherein, upon execution, the monitor application continuously running on the accessing computer system to control access of the one or more files by the accessing computer system;
   the monitor application having a user interface to receive the access key that uniquely identifies the access rules encoded to be the machine readable instructions for the monitor application to control access to the one or more files by the accessing computer system, and use the access key to authorize access to the access rules and confirm rights to access the one or more files by the accessing computer system;
   upon successful authorization of the access key, the monitor application uses a first encryption key to decrypt the access rules at the accessing computer system;
   wherein the monitor application reads the access rules having the directions for the authentication of the accessing computer system and the system attributes required to access the one or more files to transmit one or more system attributes of the accessing computer system for authentication of the accessing computer system;
   upon successful authentication, the monitor application uses a second encryption key to decrypt the one or more files for access by the accessing computer system;
   controlling activities of the accessing computer system upon the one or more files by the monitor application reading the access rules; and
   upon the monitor application determining that active file access of the one or more files by the accessing computer system is complete, the monitor application using the first encryption key to encrypt the access rules and using the second encryption key to encrypt the one or more files, wherein the monitor application decrypts the access rules and the one or more files only during the active file access by the accessing computer system.

2. The computer system of claim 1 wherein the authorizing access provides the decryption key for the access rules.

3. The computer system of claim 1 wherein the authorizing access requires real-time confirmation of the access key by a server.

4. The computer system of claim 3 wherein after the real-time confirmation of the access key, the first encryption key is used to encrypt the access rules before they are transferred to the accessing computer.

5. The computer system of claim 1 wherein the authorizing access involves providing one or more biometric inputs, random numbers or predetermined strings.

6. The computer system of claim 1 wherein the system attribute for authentication comprises the use of one or more machine attributes, device attributes or biometric attributes.

7. The computer system of claim 6 wherein the device attributes can be generated by physically inputting a random number generated by a physical device, cell phone, tablet or wearable computing device.

8. The computer system of claim 6 wherein successful authentication results in the system attribute being sent to a server for verification.

9. The computer system of claim 8 wherein after successful verification the second encryption key is returned to decrypt the one or more files.

10. The computer system of claim 8 wherein after the system attribute is verified by the server, the second encryption key is used to encrypt the one or more files before they are transferred to the accessing computer.

11. The computer system of claim 1 wherein the authentication involves using the one or more system attributes as the second encryption key to decrypt the one or more files.

12. The computer system of claim 1 wherein gaining access to the first encryption key to decrypt the access rules involves extending the access key and modifying the access key to produce a larger encryption key.

13. The computer system of claim 1 wherein producing the second encryption key to decrypt the one or more files involves extending the one or more system attributes and modifying the system attributes to produce a larger encryption key.

14. The computer system of claim 1 wherein the system attribute for authentication is gained through accessing and identifying material to be used during the process of accessing the one or more files.

15. The computer system of claim 14 wherein the material to be used is DNA material in the form of human cells.

16. The computer system of claim 14 wherein the identification of the material is achieved by sequencing human genome material used for authenticating the one or more files.

17. The computer system of claim 14 wherein the identification of the material is achieved by using genotyping to identify unique DNA material used for authenticating the one or more files.

18. The computer system of claim 14 wherein the identification of the material is achieved by using a specific portion of the DNA sequence for authenticating the one or more files.

19. The computer system of claim 1 wherein the encrypted access rules are merged with the monitor application before executing the monitor application in the accessing computer system.

20. The computer system of claim 1 wherein a checksum is first created and added to the encoded requirements before they are encrypted and sent to the accessing computer.

21. The computer system of claim 1 wherein the encrypted access rules and encrypted files are in a single file that is separated by the monitor application.

22. The computer system of claim 1 wherein the encoded requirements provide a list of required 3D replication machines that can be used to replicate the one or more files.

23. The computer system of claim 1 wherein the encoded requirements provide the number of 3D replications that are allowed to be created on the accessing computer system.

24. The computer system of claim 1 further comprising a file system on the access computing system to access the one or more files and indicate active file access by maintaining active use flags for each of the one or more files.

25. The computer system of claim 1 wherein the requirements comprise file access requirements, authorization requirements, and authentication requirements.

26. A method of protecting one or more files, the method comprising:
at a interface, listing one or more files and selectable parameters to receive requirements defining permitted activities relating to the one or more files, encoding the requirements into access rules encoded to be machine readable instructions for the monitor application, the access rules being a set of parameters that are selected at the interface to define permitted activities by the monitor application and the accessing computer system related to the one or more file, and displaying an access key that uniquely identifies the access rules encoded to be the machine readable instructions for the monitor application to control access to the one or more files by the accessing computer system, the access rules having directions for authentication of the accessing computer system and system attributes that are required to access the one or more files, the access rules encrypted for provision to the accessing computer;
at the accessing computer,
providing a user interface for receiving the access key that uniquely identifies the access rules encoded to be the machine readable instructions for the monitor application to control access to the one or more files by the accessing computer system;
executing the file access monitor application in the accessing computer system with a computer hardware device;
upon executing the monitor application, continuously running the file access monitor application on the accessing computer system to control activities of the accessing computer system;
detecting the presence of the access key at the user interface and using the file access monitor application to use the access key to authorize access to the access rules and confirm rights to access the one or more files;
receiving one or more system attributes from the accessing computer system by the monitor application reading the access rules having the directions for the authentication of the accessing computer system and the system attributes;
decrypting the access rules by the file access monitor application using a first encryption key;
using a system attribute from the accessing computer system to authenticate access to the one or more files;
upon successful authentication, accessing a second encryption key with the monitor application to decrypt the one or more files for access by the accessing computer system; and
the file access monitor application controlling activities of the accessing computer system upon the one or more files by the file access monitor application reading the access rules for a period of active file access of the one or more files by the accessing computer system;
the file monitor application decrypting the encoded requirements and the one or more files for the period of the active file access by the accessing computer system;
the monitor application determining that active file access of the one or more files by the accessing computer system is complete, using the first encryption key to encrypt the access rules and using the second encryption key to encrypt the one or more files.

\* \* \* \* \*